US012634783B2

(12) United States Patent
Jung et al.

(10) Patent No.: US 12,634,783 B2
(45) Date of Patent: May 19, 2026

(54) METHOD AND APPARATUS FOR MANAGING PSCELL MOBILITY HISTORY INFORMATION IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/538,566

(22) Filed: Dec. 13, 2023

(65) Prior Publication Data

US 2024/0205772 A1     Jun. 20, 2024

(30) Foreign Application Priority Data

Dec. 16, 2022     (KR) ........................ 10-2022-0177243

(51) Int. Cl.
*H04W 76/15*          (2018.01)
*H04W 36/00*          (2009.01)
(Continued)

(52) U.S. Cl.
CPC ...  *H04W 36/08* (2013.01); *H04W 36/008355* (2023.05); *H04W 36/008375* (2023.05); *H04W 76/20* (2018.02)

(58) Field of Classification Search
CPC ......... H04W 36/08; H04W 36/008355; H04W 36/008375; H04W 76/20;
(Continued)

(56) References Cited

U.S. PATENT DOCUMENTS

2018/0324651 A1   11/2018  Tenny et al.
2019/0373442 A1*  12/2019  Kim ..................... H04W 24/10
(Continued)

FOREIGN PATENT DOCUMENTS

EP        4250808 A1      9/2023
WO    2022-139416 A1     6/2022
WO    2022-208434 A1    10/2022

OTHER PUBLICATIONS

PSCell information storing in Mobility History Information [E120, E121, E122], R2-2208167, 3GPP TSG-RAN WG2 Meeting #119-e , Aug. 10, 2022 (Year: 2022).*
(Continued)

*Primary Examiner* — Ayman A Abaza
*Assistant Examiner* — Tracy L Williams
(74) *Attorney, Agent, or Firm* — Jefferson IP Law, LLP

(57)          ABSTRACT

The disclosure relates to a fifth generation (5G) or sixth generation (6G) communication system for supporting a higher data transmission rate. A method performed by a user equipment (UE) in a wireless communication system is provided. The method includes entering a radio resource control (RRC) connected mode with a first primary cell (PCell), performing secondary node addition procedure with a primary secondary cell (PSCell), and storing visited information associated with the first PCell and the PSCell in case that the first PCell is changed to a second PCell and the PSCell is released at the same time as the change of the first PCell to the second PCell.

11 Claims, 12 Drawing Sheets

(51) Int. Cl.

| | |
|---|---|
| *H04W 36/08* | (2009.01) |
| *H04W 36/32* | (2009.01) |
| *H04W 76/20* | (2018.01) |
| *H04W 76/34* | (2018.01) |
| *H04W 88/06* | (2009.01) |

(58) Field of Classification Search
CPC ........... H04W 36/00692; H04W 76/15; H04W 76/34; H04W 36/0069; H04W 36/32; H04W 88/06
USPC ........................................................ 370/331
See application file for complete search history.

(56) References Cited

U.S. PATENT DOCUMENTS

| | | | | |
|---|---|---|---|---|
| 2021/0099926 | A1* | 4/2021 | Chen ................... | H04W 36/362 |
| 2021/0168654 | A1* | 6/2021 | Futaki ................... | H04W 76/16 |
| 2022/0038929 | A1* | 2/2022 | Tsuboi ................. | H04W 76/15 |
| 2022/0167215 | A1* | 5/2022 | Hu ........................ | H04W 4/029 |
| 2024/0306076 | A1* | 9/2024 | Bergström ............ | H04W 24/10 |
| 2025/0193094 | A1* | 6/2025 | Bin Redhwan ......... | H04L 43/04 |

OTHER PUBLICATIONS

Ericsson et al., PSCell information storing in Mobility History Information [E120, E121, E122], R2-2208167, 3GPP TSG-RAN, Aug. 10, 2022.

Qualcomm Inc., SON MDT UE Capabilities and User Consent, R2-2203427, 3GPP TSG-RAN WG2 Meeting #117-e, Feb. 14, 2022.

International Search Report dated Feb. 23, 2024, issued in International Patent Application No. PCT/KR2023/020555.

Huawei et al., Discussion on logging of PSCell information in MHI, 3GPP Draft, R2-2207945, Aug. 10, 2022, XP052261261.

Nokia et al., Issues with nested MHI [H098][N094][N095][E121][H071][E122], 3GPP Draft, R2-2206132, May 3, 2022, XP052204742.

Extended European Search Report dated Feb. 18, 2026, issued in European Patent Application No. 23904005.8.

* cited by examiner

Figure 1L:
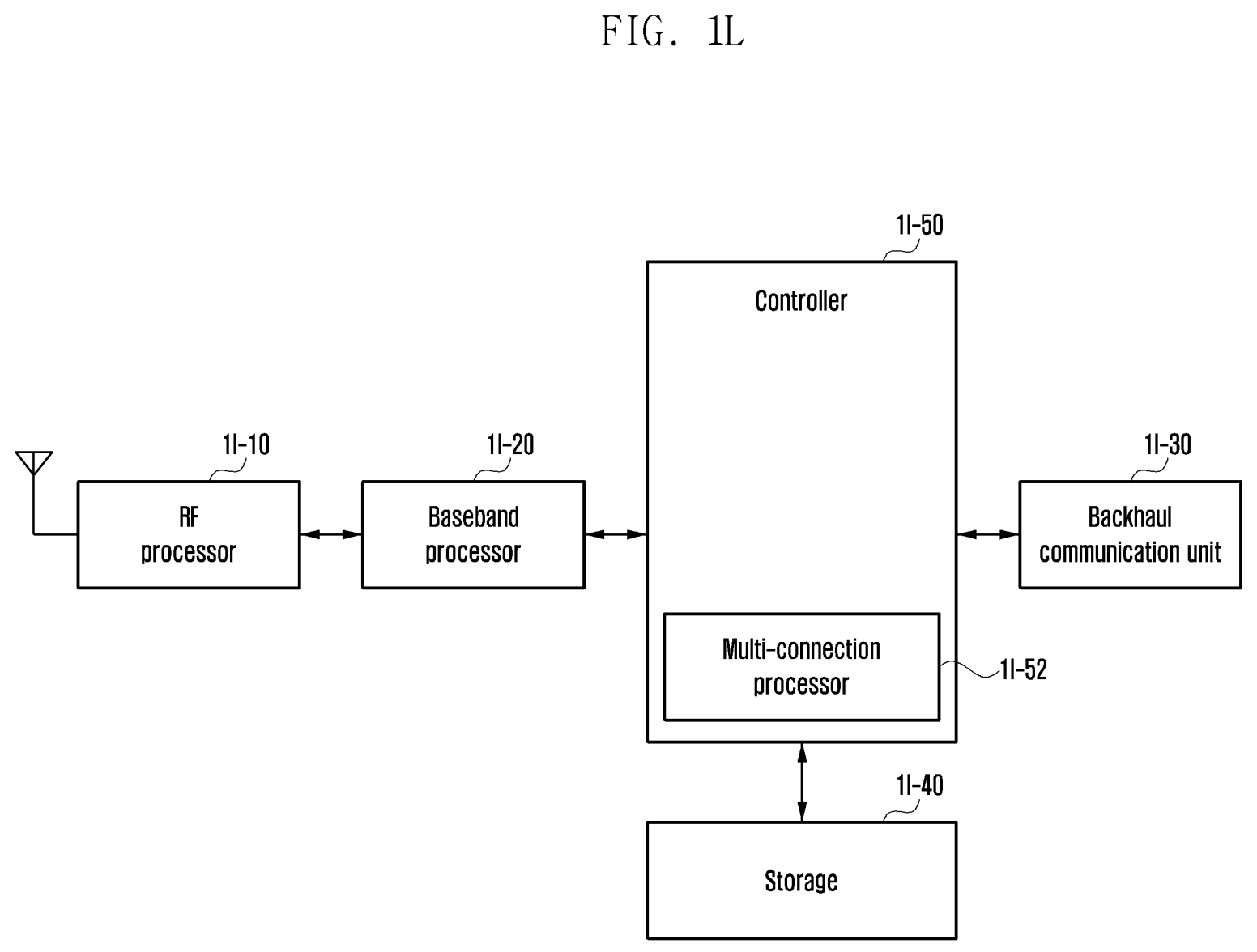

FIG. 1L 1I-30
Backhaul
communication unit 1I-50
Controller 1I-52
Multi-connection
processor 1I-40
Storage 1I-20
Baseband
processor 1I-10
RF
processor

METHOD AND APPARATUS FOR MANAGING PSCELL MOBILITY HISTORY INFORMATION IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2022-0177243, filed Dec. 16, 2022, in the Korean Intellectual Property Office, the disclosure of which is incorporated by reference herein in its entirety.

BACKGROUND

1. Field

The disclosure relates to a method and apparatus for a terminal to store pscell mobility history information and transmit the same to a base station.

2. Description of Related Art

Fifth generation 5G mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mm Wave, supporting numerologies (for example, operating multiple subcarrier spacings) for efficiently utilizing mm Wave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to perform network operation of a base station more efficiently by disclosing a method for a terminal and a base station to manage mobility history information related to a primary secondary cell (PSCell).

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes entering an radio resource control (RRC) connected mode with a first primary cell (PCell), performing secondary node addition procedure with a PSCell, and storing visited information associated with the first PCell and the PSCell in case that the first PCell is changed to a second PCell and the PSCell is released at a same time as a change of the first PCell to the second PCell.

In accordance with another aspect of the disclosure, a UE in a wireless communication system is provided. The UE includes a transceiver and at least one processor configured to enter an RRC connected mode with a first PCell, perform secondary node addition procedure with a PSCell, and store visited information associated with the first PCell and the PSCell, in case that the first PCell is changed to a second PCell and the PSCell is released at a same time as a change of the first PCell to the second PCell.

In accordance with another aspect of the disclosure, one or more non-transitory computer-readable storage media storing computer-executable instructions are provided. The instructions, when executed by at least one processor of an electronic device, cause the electronic device to perform operations, the operations including entering a RRC connected mode with a first PCell, performing secondary node addition procedure with a PSCell, and in case that the first PCell is changed to a second PCell and the PSCell is released at a same time as a change of the first PCell to the second PCell, storing visited information associated with the first PCell and the PSCell.

According to the disclosure, the terminal can store mobility history information related to the PSCell and transmit it to the base station, and the base station can determine a terminal configuration method for dual connectivity, or the like, through the mobility history information received from the terminal. Accordingly, the efficiency of network operation can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1L is a block diagram illustrating a constitution of a new radio (NR) base station according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of known functions and structures incorporated herein may be omitted to avoid obscuring the subject matter of the disclosure. Embodiments of the disclosure are described with reference to the accompanying drawings.

Terms for identifying access nodes, terms referring to network entities, terms referring to messages, terms referring to interfaces between network entities, and terms referring to various kinds of identification information, used in the following description, are examples for convenience of description. Therefore, the disclosure may not be limited by the terms to be described later, and other terms that indicate subjects having equivalent technical meanings may be used.

Hereinafter, terms and names defined by the 3rd generation partnership project long term evolution (3GPP LTE) standard will be used in the disclosure for convenience of description. However, the disclosure is not limited to the terms and names, and is identically applicable to other systems following different standards. In the disclosure, an evolved node B (eNB) may be used interchangeably with a gNB for convenience of description. For example, a base station described as an eNB may refer to a gNB.

Figure 1A:
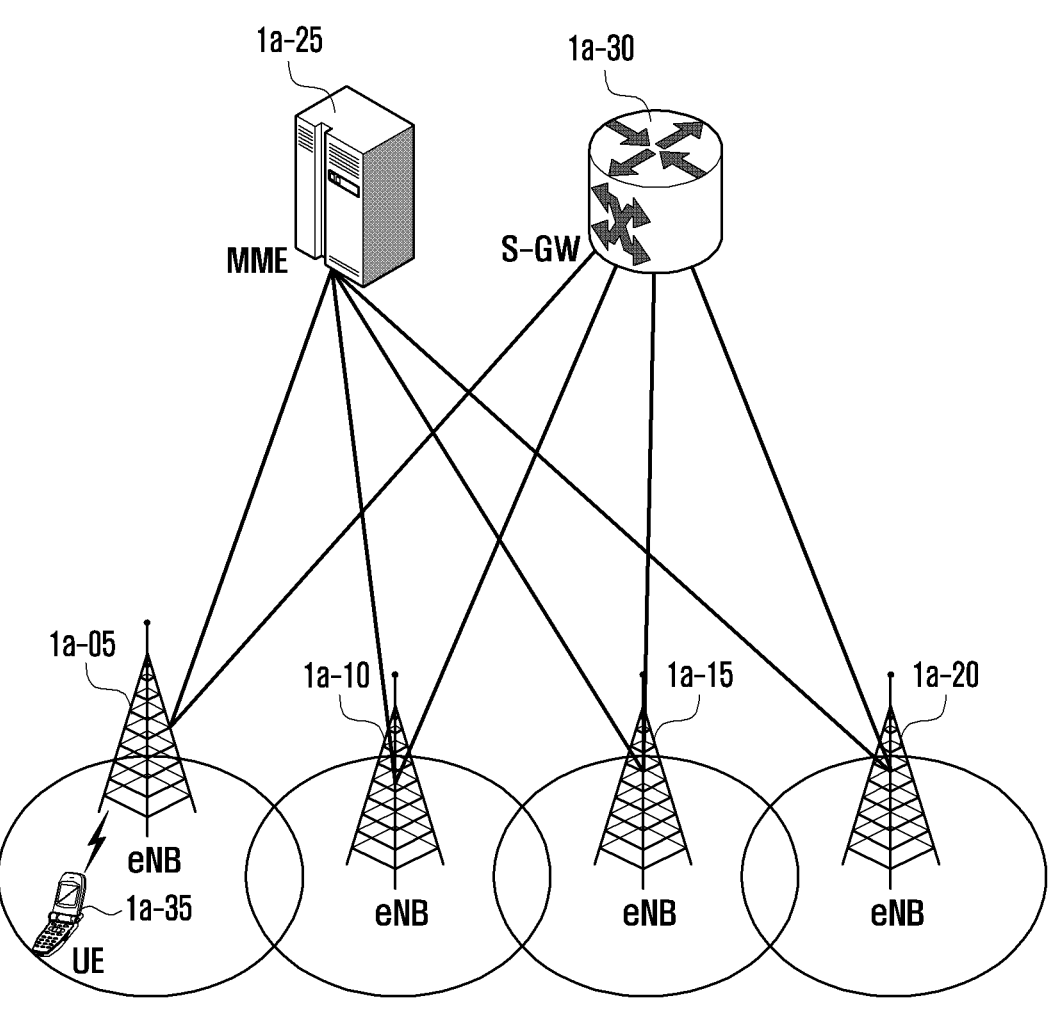
FIG. 1A is a diagram illustrating a structure of a long term evolution (LTE) system according to an embodiment of the disclosure.

FIG. 1A is a diagram illustrating a structure of an LTE system according to an embodiment of the disclosure.

Referring to FIG. 1A, as illustrated, a radio access network of an LTE system includes next generation base stations (evolved node B, hereinafter, eNB, Node B, or base station) 1a-05, 1a-10, 1a-15, and 1a-20, a mobility management entity (MME) 1a-25, and a serving-gateway (S-GW) 1a-30. A user equipment (hereinafter, UE or terminal) 1a-35 accesses an external network through the eNBs 1a-05 to 1a-20 and the serving gateway (S-GW) 1a-30.

Referring to FIG. 1A, the ENBs 1a-05 to 1a-20 correspond to an existing node B of the universal mobile telecommunications system (UMTS). The eNB is connected to the UE 1a-35 through a radio channel and performs a more complicated role than an existing node B. In the LTE system, in addition to a real-time service like a voice over internet protocol (VOIP) through the Internet protocol, all the user traffics are served through a shared channel, and therefore an apparatus for collecting and scheduling status information, such as a buffer status, an available transmission power status, and a channel state of the UEs is required, which is performed by the eNBs 1a-05 to 1a-20. One eNB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 megahertz (MHz). Further, an adaptive modulation & coding (hereinafter, AMC) scheme for determining a modulation scheme and a channel coding rate depending on a channel status of the terminal is applied. The S-GW 1a-30 is an apparatus for providing a data bearer and generates or removes the data bearer according to the control of the MME 1a-25. The MME is an apparatus for performing a mobility management function for the terminal and various control functions and is connected to a plurality of base stations.

Figure 1B:
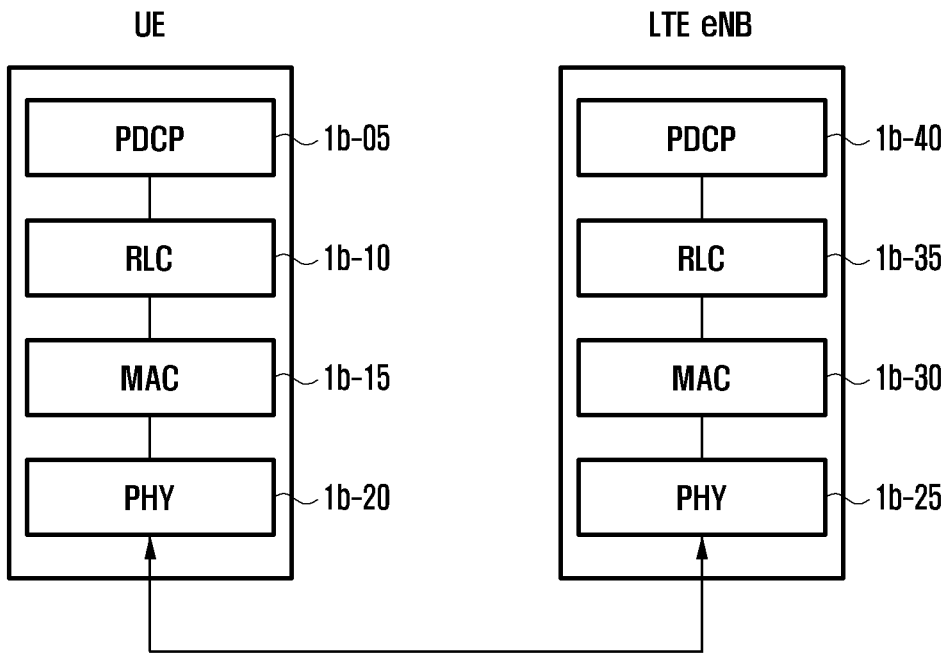
FIG. 1B is a diagram illustrating a radio protocol structure of an LTE system according to an embodiment of the disclosure.

FIG. 1B is a diagram illustrating a radio protocol structure of an LTE system according to an embodiment of the disclosure.

Referring to FIG. 1B, the radio protocol of the LTE system includes packet data convergence protocols (PDCPs) 1b-05 and 1b-40, radio link controls (RLCs) 1b-10 and 1b-35, and medium access controls (MACs) 1b-15 and 1b-30 in an UE and in an eNB, respectively. The PDCPs 1b-05 and 1b-40 controls operations, such as IP header compression/decompression. The main functions of the PDCP are summarized as follows.

- Header compression and decompression functions (header compression and decompression: ROHC only)
- Transfer function of user data
- In-sequence delivery function (in-sequence delivery of upper layer PDUs at PDCP re-establishment procedure for RLC AM)
- Reordering function (for split bearers in DC (only support for RLC AM): PDCP PDU routing for transmission and PDCP PDU reordering for reception)
- Duplicate detection function (duplicate detection of lower layer SDUs at PDCP re-establishment procedure for RLC AM)
- Retransmission function (retransmission of PDCP SDUs at handover and, for split bearers in DC, of PDCP PDUs at PDCP data-recovery procedure, for RLC AM)
- Ciphering and deciphering functions
- Timer-based SDU discard function (timer-based SDU discard in uplink.)

The radio link controls (hereinafter, RLCs) 1b-10 and 1b-35 reconstitutes the PDCP packet data unit (PDU) to an appropriate size to perform the automatic repeat request (ARQ) operation or the like. The main functions of the RLC are summarized as follows.

- Data transfer function (transfer of upper layer PDUs)
- ARQ function (Error Correction through ARQ (only for AM data transfer))
- Concatenation, segmentation and reassembly functions (concatenation, segmentation and reassembly of RLC SDUs (only for UM and AM data transfer))
- Re-segmentation function (re-segmentation of RLC data PDUs (only for AM data transfer))
- Reordering function (reordering of RLC data PDUs (only for UM and AM data transfer)
- Duplicate detection function (duplicate detection (only for UM and AM data transfer))
- Protocol error detection function (protocol error detection (only for AM data transfer))
- RLC SDU discard function (RLC SDU discard (only for UM and AM data transfer))
- RLC re-establishment function The MACs 1b-15 and 1b-30 are connected to several RLC layer entities constituted in one terminal and perform an operation of multiplexing RLC PDUs into an MAC PDU and demultiplexing the RLC PDUs from the MAC PDU. The main functions of the MAC are summarized as follows.

- Mapping function (Mapping between logical channels and transport channels)
- Multiplexing and demultiplexing functions (multiplexing/demultiplexing of MAC SDUs belonging to one or different logical channels into/from transport blocks (TB) delivered to/from the physical layer on transport channels)
- Scheduling information reporting function
- HARQ function (error correction through HARQ)
- Priority handling function between logical channels (priority handling between logical channels of one UE)
- Priority handling function between UEs (priority handling between UEs by means of dynamic scheduling)
- MBMS service identification function
- Transport format selection function
- Padding function Physical layers 1b-20 and 1b-25 perform channel-coding and modulating higher layer data, making the higher layer data as an orthogonal frequency-division multiplexing (OFDM) symbol and transmitting them to a radio channel, or demodulating and channel-decoding the OFDM symbol received through the radio channel and transmitting the demodulated and channel-decoded OFDM symbol to the higher layer.

Figure 1C:
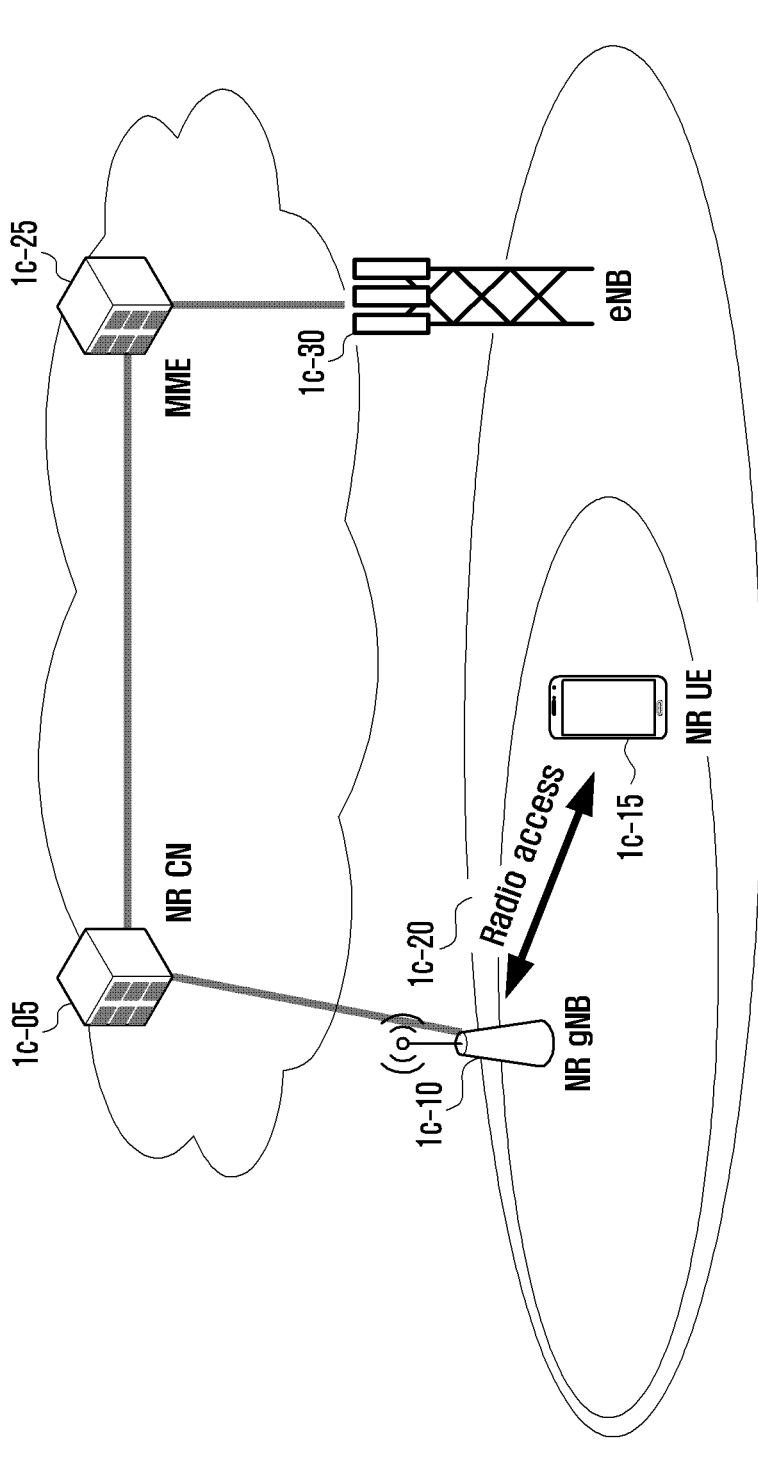
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, as illustrated, a radio access network 1c-20 of a next generation mobile communication system (hereinafter, NR or 5G) includes a next generation base station (new radio node B, hereinafter NR gNB or NR base station) 1c-10 and a new radio (NR) core network (CN) 1c-05. The user terminal (new radio user equipment, hereinafter NR UE or UE) 1c-15 accesses the external network through the NR gNB 1c-10 and the NR CN 1c-05.

Referring to FIG. 1C, the NR gNB 1c-10 corresponds to an evolved Node B (eNB) of the existing LTE system. The NR gNB is connected to the NR UE 1c-15 via a radio channel and may provide a service superior to the existing node B. In the next generation mobile communication system, since all user traffics are served through a shared channel, an apparatus for collecting state information, such as a buffer state, available transmission power state, and channel state of the UEs to perform scheduling is required, which is performed by the NR NB 1c-10. One NR gNB generally controls a plurality of cells. In order to realize high-speed data transmission compared with the current LTE, the NR gNB may have an existing maximum bandwidth, and may be additionally incorporated into a beamforming technology and may be applied by using OFDM as a radio access technology. Further, an adaptive modulation & coding (hereinafter, AMC) scheme determining a modulation scheme and a channel coding rate depending on a channel status of the terminal is applied. The NR CN 1c-05 may perform functions, such as mobility support, bearer configuration, quality of service (QOS) configuration, and the like. The NR CN is an entity for performing a mobility management function for the terminal and various control functions and is connected to a plurality of base stations. In addition, the next generation mobile communication system can interwork with the existing LTE system, and the NR CN is connected to the MME 1c-25 through the network interface. The MME is connected to the eNB 1c-30 which is the existing base station.

Figure 1D:
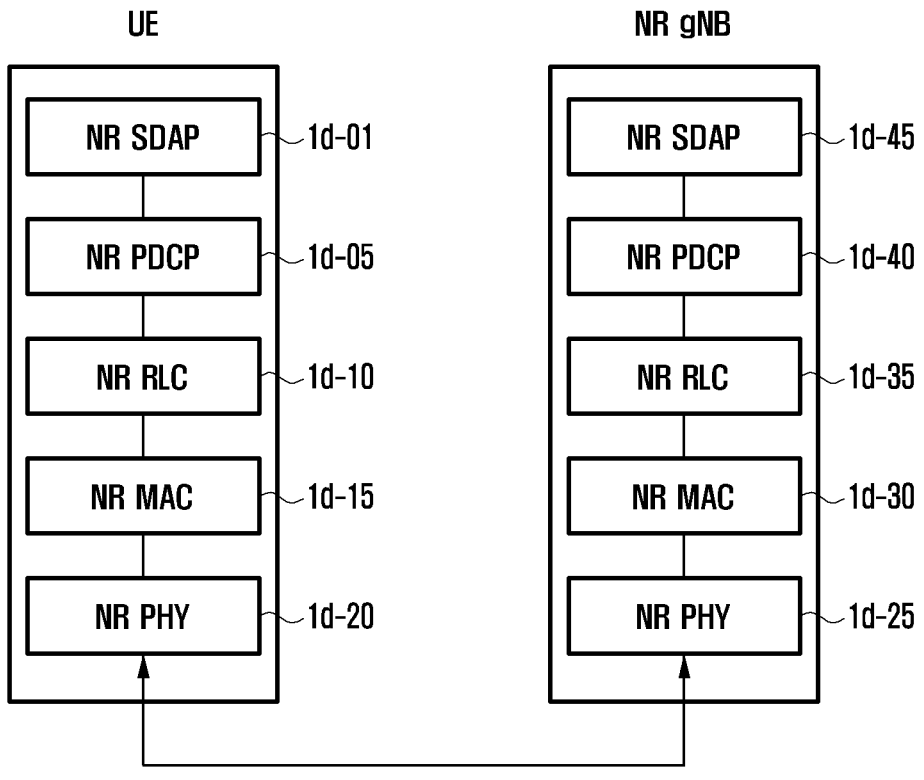
FIG. 1D is a diagram of a radio protocol structure of a next generation mobile communication system according to an embodiment of the disclosure.

FIG. 1D is a diagram of a radio protocol structure of a next generation mobile communication system according to an embodiment of the disclosure.

FIG. 1D is a diagram of a radio protocol structure of a next generation mobile communication system to which the disclosure is applicable.

Referring to FIG. 1D, the radio protocol of the next generation mobile communication system includes NR SDAPs 1d-01 and 1d-45, NR PDCPs 1d-05 and 1d-40, NR RLCs 1d-10 and 1d-35, and NR MACs 1d-15 and 1d-30 in each of the terminal and the NR base station.

The main functions of the NR SDAPs 1d-01 and 1d-45 may include some of the following functions.

Transfer function of user data (transfer of user plane data)

Mapping function between QoS flow and data bearer for uplink and downlink (mapping between a QoS flow and a DRB for both DL and UL) Marking function of QoS flow ID in uplink and downlink (marking QoS flow ID in both DL and UL packets)

Mapping function of reflective QoS flow to data bearer for uplink SDAP PDUs (reflective QoS flow to DRB mapping for the UL SDAP PDUs).

For the SDAP layer entity, the UE may be configured on whether to use a header of the SDAP layer entity or a function of the SDAP layer entity for each PDCP layer entity, for each bearer, or for each logical channel based on an RRC message. In case where the SDAP header is configured, the UE may instruct to update or reconfigure a QoS flow of the uplink and downlink and mapping information on data bearer with NAS QOS reflection configuration 1-bit indicator (NAS reflective QoS) and AS QoS reflection configuration 1-bit indicator (AS reflective QoS) of the SDAP header. The SDAP header may include QoS flow ID information representing QoS. The QoS information may be used as a data processing priority, scheduling information, and the like to support a smooth service.

Main functions of the NR PDCPs 1d-05 and 1d-40 may include some of the following functions.

Header compression and decompression functions (header compression and decompression: ROHC only)

Transfer function of user data

In-sequence delivery function (in-sequence delivery of upper layer PDUs)

Out-of-sequence delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Ciphering and deciphering functions

Timer-based SDU discard function (timer-based SDU discard in uplink.)

In the above, a reordering function of the NR PDCP entity refers to a function of reordering PDCP PDUs received from the lower layer based on the PDCP sequence number (SN), and may include a function of delivering data to the higher layer in the reordered order, or may include a function of immediately delivering without considering the order, a function of recording lost PDCP PDUs by reordering, a function of reporting a status of lost PDCP PDUs to the transmission side, and a function of requesting retransmission of lost PDCP PDUs.

Main functions of the NR RLCs 1d-10 and 1d-35 may include some of the following functions.

Data transfer function (transfer of upper layer PDUs)

In-sequence delivery function (in-sequence delivery of upper layer PDUs)

Out-of-sequence delivery function (out-of-sequence delivery of upper layer PDUs)

ARQ function (error Correction through ARQ)

Concatenation, segmentation and reassembly functions (concatenation, segmentation and reassembly of RLC SDUs)

Re-segmentation function (re-segmentation of RLC data PDUs)

Reordering function (reordering of RLC data PDUs)

Duplicate detection function

Error detection function (protocol error detection)

RLC SDU discard function

RLC re-establishment function

In the above, in-sequence delivery of the NR RLC entity refers to a function of delivering RLC SDUs received from the lower layer in order to a higher layer, and in case where one RLC SDU is originally divided into several RLC SDUs and received, the in-sequence delivery may include a function of reassembling and delivering the several RLC SDUs, a function of rearranging the received RLC PDUs based on an RLC sequence number (SN) or PDCP SN, a function of reordering and recording lost RLC PDUs, a function of reporting a status of lost RLC PDUs to the transmitting side, and a function of requesting retransmission of lost RLC PDUs, and in case where there is a lost RLC SDU, the in-sequence delivery may include a function of delivering only RLC SDUs before the lost RLC SDU in order to the higher layer, or even if there is a lost RLC SDU, when a predetermined timer expires, the in-sequence delivery may include a function of delivering all RLC SDUs received before the start of the timer in order to the higher layer, or even if there is a lost RLC SDU, when a predetermined timer expires, the in-sequence delivery may include a function of delivering all RLC SDUs received so far in order to the higher layer. Further, RLC PDUs may be processed in order of reception (sequence number, regardless of the order of sequence number, and the order of arrival) and be delivered to the PDCP entity out-of sequence delivery, and in the case of a segment, segments may be stored in a buffer or segments be received later may be received, reconstituted into one complete RLC PDU, processed, and delivered to the PDCP entity. The NR RLC layer may not include a concatenation function, and the function may be performed in the NR MAC layer or may be replaced with a multiplexing function of the NR MAC layer.

In the above, out-of-sequence delivery of the NR RLC entity refers to a function of directly delivering RLC SDUs received from a lower layer to a higher layer regardless of the order, and in case where one RLC SDU is originally divided and received into several RLC SDUs, the out-of-sequence delivery function may include a function of reassembling and transmitting the RLC SDUs, and a function of storing an RLC SN or PDCP SN of the received RLC PDUs, sorting the order, and recording the lost RLC PDUs.

The NR MACs 1d-15 and 1d-30 may be connected to several NR RLC layer entities constituted in one UE, and main functions of the NR MAC may include some of the following functions.

Mapping function (mapping between logical channels and transport channels)

Multiplexing and demultiplexing functions (Multiplexing/demultiplexing of MAC SDUs)

Scheduling information reporting function

HARQ function (error correction through HARQ)

Priority handling function between logical channels (priority handling between logical channels of one UE)

Priority handling function between UEs (priority handling between UEs by means of dynamic scheduling)

MBMS service identification function

Transport format selection function

Padding function

The NR PHY layers 1d-20 and 1d-25 perform an operation of channel-coding and modulating higher layer data, converting the higher layer data into OFDM symbols, and transmitting the OFDM symbols to the radio channel, or demodulating and channel-decoding OFDM symbols received through the radio channel to transfer the OFDM symbols to the higher layer.

Figure 1E:
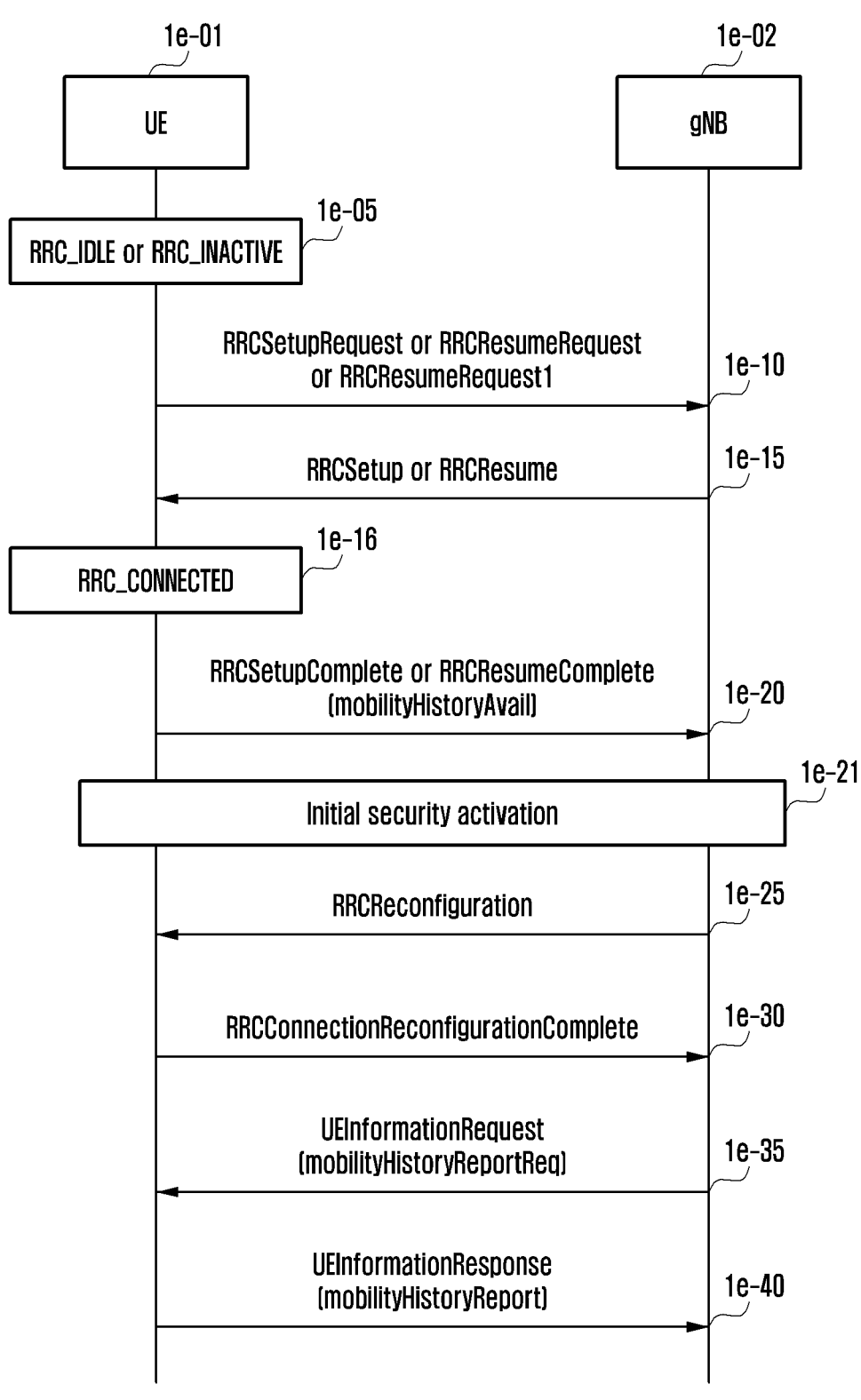
FIG. 1E is a flowchart of a process in which a user equipment (UE) reports mobility history information to a base station in a next-generation mobile communication system according to an embodiment of the disclosure.

FIG. 1E is a flowchart of a process in which a UE reports mobility history information to a base station in a next-generation mobile communication system according to an embodiment of the disclosure.

Referring to FIG. 1E, a UE 1e-01 may be in an RRC idle mode (RRC_IDLE) or RRC inactive mode (RRC_INACTIVE).

The UE 1e-01 in the RRC idle mode (in operation 1e-05) may transmit an RRC connection request message (RRC-SetupRequest) to a base station 1e-02 in order to perform an RRC connection configuration procedure with the base station 1e-02 (in operation 1e-10). In response to this, the base station 1e-02 having received the RRC connection request message may transmit an RRC connection configuration message (RRCSetup) to the UE 1e-01 (in operation 1e-15). The UE having received the RRC connection configuration message may apply this, and may be transitioned to the RRC connected mode (1e-16). Further, the UE in the RRC connected mode may transmit an RRC connection configuration complete message (RRCSetupComplete) to the base station (1e-20). In case where the UE supports storage of mobility history information and the UE has mobility history information available in VarMobilityHistoryReport (If the UE supports storage of mobility history information and the UE has mobility history information available in VarMobilityHistoryReport), the UE may include a mobilityHistory Avail indicator in the RRC connection configuration complete message to be transmitted to the base station (1e-20).

The UE 1e-01 in the RRC inactive mode may transmit, to the base station, an RRC connection resume request message (RRCResumeRequest or RRCResumeRequest1) to perform an RRC connection resume procedure with the base station 1e-02 (in operation 1e-10). In response to this, the base station 1e-02 having received the RRC connection resume request message may transmit an RRC connection resume message (RRCResume) to the UE 1e-01 (in operation 1e-15). The UE having received the RRC connection resume message may apply this, and may be transitioned to the RRC connection mode (in operation 1e-16). Further, the UE in the RRC connected mode may transmit an RRC connection resume complete message (RRCResumeComplete) to the base station (in operation 1e-20). In case where the UE supports storage of mobility history information and the UE has mobility history information available in VarMobilityHistoryReport) (If the UE supports storage of mobility history information and the UE has mobility history information available in VarMobilityHistoryReport), the UE may include the mobilityHistoryAvail indicator in the RRC connection resume complete message to be transmitted to the base station (in operation 1e-20).

The UE 1e-01 that has not yet made security configuration may perform an initial security activation procedure with the base station 1e-02 (in operation 1e-21). As an example, the UE that has not yet made security configuration may mean a UE that has been switched from the RRC idle mode to the RRC connected mode. Specifically, the UE 1e-01 may transmit a security mode command message (SecurityModeCommand) to the base station 1e-02, and in response to this, the base station may transmit a security mode complete message (SecurityModeComplete) to the UE.

At operation 1e-25, in order to perform an RRC connection reconstitution procedure, the base station 1e-02 may transmit an RRC connection reconstitution message (RRCReconfiguration) to the UE 1e-01 in an RRC connected mode. The UE applies the received RRC connection reconstitution message, and in response to this, may transmit an RRC connection reconstitution complete message (RRCReconfigurationComplete) to the base station (in operation 1e-30).

At operation 1e-35, the base station 1e-02 may perform UE information procedure in case of having successfully performed security activation. In order to request mobility history information from the UE 1e-01, the base station 1e-02 may transmit a UE information request message (UEInformationRequest) to the UE (in operation 1e-35). The UE information request message may include a MobilityHistoryReportReq indicator.

At operation 1e-40, the UE 1e-01 having successfully performed the security activation may transmit a UE information response message (UEInformationResponse) to the base station 1e-02 (in operation 1e-40). In case where the mobilityHistoryReportReq is configured to true in the received UE information request message (If mobilityHistoryReportReq is set to true), the UE may perform the following series of procedures.

The UE may include the mobilityHistoryReport included in VarMobilityHistoryReport. (include the mobilityHistoryReport and set it to include entries from VarMobilityHistoryReport)

The UE may include in the mobility HistoryReport information about the current cell, possibly after removing the oldest entry if required, as follows (include in the mobilityHistoryReport an entry for the current cell, possibly after removing the oldest entry if required, set its fields as follows).

The UE may set the global cell identity of the current cell to visitedCellId (set visitedCellId to the global cell identity of the current cell).

The UE may set the time spent in the current cell to field timeSpent (set field timeSpent to the time spent in the current cell).

By performing the above procedures, the UE may include the mobilityHistoryReport in the UE information response message, and may transmit the UE information response message to the base station (in operation 1e-40).

The UE according to a next-generation mobile communication system may have the following characteristics in storing mobility history information and reporting it to the base station.

The UE does not inform the base station whether the UE supports storing mobility history information by transmitting a separate UE capability information message (UECapabilityInformation). Instead, the UE supports storing mobility history information and transmits an RRC connection establishment complete message or an RRC connection resume complete message with a mobilityHistoryAvail indicator only in case where there is mobility history information in VarMobilityHistoryReport.

The UE does not store information about a PSCell that the UE has connected or stayed in mobility history information.

The UE stores only the cell information list of cells in which the UE has stayed in RRC idle mode or RRC inactive mode, the time information that the UE has stayed in each cell, and the cell information list of cells in which the UE has stayed in RRC connected mode and the time information that the UE has stated in each cell in mobility history information and reports it to the base station.

Figure 1F:
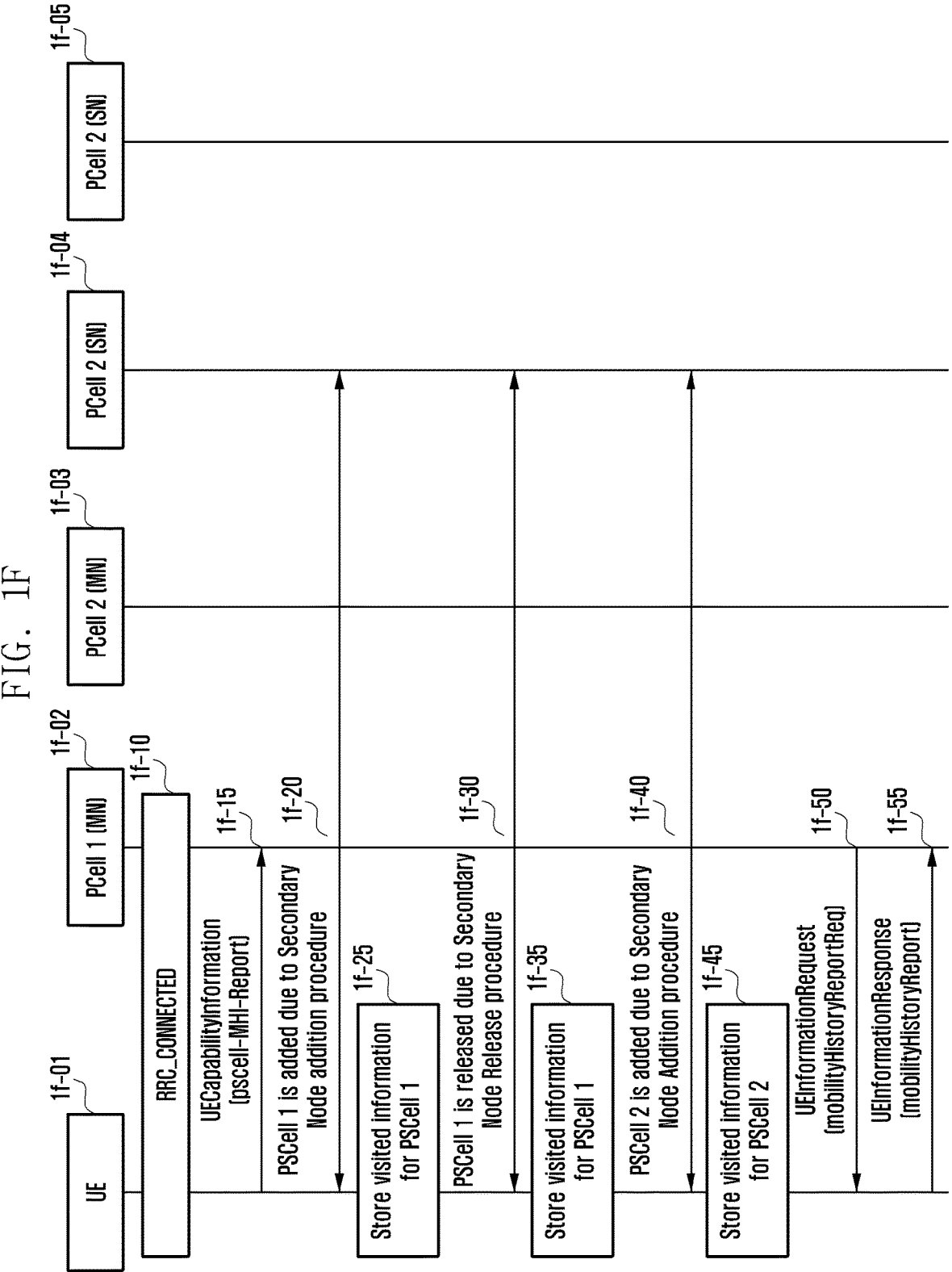
FIG. 1F is a diagram illustrating an operation of a UE for storing primary secondary cell (pscell) mobility history information and reporting it to a base station in a next-generation mobile communication system according to an embodiment of the disclosure.

FIG. 1F is a diagram illustrating an operation of a UE for storing pscell mobility history information and reporting it to a base station in a next-generation mobile communication system according to an embodiment of the disclosure.

Referring to FIG. 1F, the UE 1f-01 may establish an RRC connection with the base station 1f-02 and enter the RRC connected mode (RRC_CONNECTED) (in operation 1f-10). The base station may be referred to as PCell 1 or master node (MN) base station.

At operation 1f-15, the UE 1f-01 may transmit a UE capability information message (UECapabilityInformation) to the PCell 1 1f-02. In case where the UE according to an embodiment of the disclosure has the ability to store pscell mobility history information and report it to the base station through the UE information response message (UEInformationResponse), the UE may transmit the UE capability information message including the pscell-MHI-Report indicator to the PCell 1 1f-02. The UE according to an embodiment of the disclosure may support storage of the mobility history information of the above-described embodiment. For reference, the description of pscell-MHI-Report is as follows.

TABLE 1

| Definitions for parameters | Per | M | FDD-TDD DIFF | FR1-FR2 DIFF |
|---|---|---|---|---|
| pscell-MHI-Report-r17 Indicates whether the UE supports the storage of pscell mobility history information and the reporting in UEInformationResponse message as specified in TS 38.331 [9]. | UE | No | No | No |

At operation 1f-20, the master node (MN) 1f-02 may initiate the secondary node addition procedure to add a secondary node (SN) 1f-04. In the disclosure, the SN base station may be referred to as PSCell 1. Specific secondary node addition procedure may be performed according to Section 10.2 of TS 37.340. For example, PSCell 1 1f-04 may be added to the UE 1f-01 at operation 1f-20.

At operation 1f-25, the UE supports pscell mobility history information and may perform the following operations when the PSCell 1 1f-04 is added.

1> If the UE supports pscell mobility history information and upon addition of a PSCell:
  2> include an entry in visitedPSCellInfoList in variable VarMobilityHistoryReport possibly after performing the following, if necessary:
    3> if visitedPSCellInfoListReport is available in the visitedCellInfoList in variable VarMobilityHistoryReport:
      4> for the oldest PCell entry in visitedCellInfoList including visited PSCellInfoListReport:
      5> remove the oldest entry in the visitedPSCellInfoListReport;
    3> else:
      4> remove the oldest entry in visitedPSCellInfoList in variable VarMobilityHistoryReport;
  2> for the included entry:
    3> set the field timeSpent of the entry according to following:
      4> if this is the first PSCell entry for the current PCell since entering the current PCell in RRC_CONNECTED:
      5> include the entry as the time spent with no PSCell since entering the current PCell in RRC_CONNECTED;
      4> else:
      5> include the time spent with no PSCell since last PSCell release or include the time spent with no PSCell since last PSCell release while being connected to the current PCell;

At operation 1f-30, the PSCell 1 1f-04 configured to the UE 1f-01 may be released through a secondary node release procedure. The specific secondary node release procedure or secondary node change procedure may be performed according to Section 10.4 of TS 37.340.

At operation 1f-35, the UE may support pscell mobility history information and may perform the following operation when the PSCell 1 1f-04 is released while being connected to the current PCell 1 1f-02.

1> If the UE supports pscell mobility history information and upon change, or release of a PSCell while being connected to the current PCell:

2> include an entry in visitedPSCellInfoList of the variable VarMobilityHistoryReport possibly after performing the following, if necessary:

3> if visitedPSCellInfoListReport is available in the visitedCellInfoList in variable VarMobilityHistoryReport:

4> for the oldest PCell entry in visitedCellInfoList including visited pscellInfoListReport;

5> remove the oldest entry in the visitedPSCellInfoListReport;

3> else:

4> remove the oldest entry in visitedPSCellInfoList in variable VarMobilityHistoryReport;

2> for the included entry:

3> if the global cell identity of the previous PSCell is available:

4> include the global cell identity of that cell in the field visitedCellId of the entry;

3> else:

4> include the physical cell identity and carrier frequency of that cell in the field visitedCellId of the entry;

3> set the field timeSpent of the entry as the time spent in the previous PSCell while being connected to the current PCell;

At operation 1f-40, the mater node (MN) 1f-02 may initiate the secondary node addition procedure to add the secondary node (SN) 1f-05. In the disclosure, the SN base station may be referred to as PSCell 2. Specific secondary node addition procedure may be performed according to Section 10.2 of TS 37.340. For example, the PSCell 2 1f-05 may be added to the UE 1f-01 at operation 1f-40.

At operation 1f-45, the UE may support pscell mobility history information and may perform the following operations when the above PSCell 2 1f-05 is added.

1> If the UE supports pscell mobility history information and upon addition of a PSCell:

2> include an entry in visitedPSCellInfoList in variable VarMobilityHistoryReport possibly after performing the following, if necessary:

3> if visitedPSCellInfoListReport is available in the visitedCellInfoList in variable VarMobilityHistoryReport:

4> for the oldest PCell entry in visitedCellInfoList including visitedPSCellInfoListReport;

5> remove the oldest entry in the visitedPSCellInfoListReport;

3> else:

4> remove the oldest entry in visitedPSCellInfoList in variable VarMobilityHistoryReport;

2> for the included entry:

3> set the field timeSpent of the entry according to following:

4> if this is the first PSCell entry for the current PCell since entering the current PCell in RRC_CONNECTED:

5> include the entry as the time spent with no PSCell since entering the current PCell in RRC_CONNECTED;

4> else:

5> include the time spent with no PSCell since last PSCell release or include the time spent with no PSCell since last PSCell release while being connected to the current PCell;

The UE according to an embodiment of the disclosure enters an RRC connection mode in the current PCell 1, and then, in case where it is not the first PSCell entry for the current PCell 1, the time when there the PSCell is not present may be recorded after the previous PSCell (i.e., PSCell 1) is released and before a new pscell (i.e., PSCell 2) is added. For example, the UE may record the time when the PSCell is not present in a timeSpent field after the PSCell 1 1f-04 is released at operation 1f-30 and before the PSCell 2 1f-05 is added at operation 1f-40. Through this, the UE may record the time when the PSCell 1 1f-04 is not present while the current PCell 1 1f-02 is maintained, the time when the UE stays in the PSCell 1 1f-04, and the time when the PSCell 2 is not present before the PSCell 2 1f-05 is added, so that the UE may inform the base station of the UE's mobility information.

At operation 1f-50, the UE 1f-01 may receive a UE information request message (UEInformationRequest) from the PCell 1 1f-02. In the above message, mobilityHistoryReportReq may be set to true.

At operation 1f-55, the UE 1f-01 may transmit the UE information response message (UEInformationResponse) to the PCell 1 1f-02. For example, in case where the mobilityHistoryReportReq included in the UE information request message received at operation 1f-50 is set to true, the UE may perform the following operations.

2> include the mobilityHistoryReport and set it to include visitedCellInfoList from VarMobilityHistoryReport;

2> include in the mobilityHistoryReport an entry for the current PCell, possibly after removing the oldest entry if required, and set its fields as follows:

3> set visitedCellId to the global cell identity or the physical cell identity and carrier frequency of the current PCell:

3> set field timeSpent to the time spent in the current PCell;

3> if the UE supports pscell mobility history information and if visitedpscellnfoList is present in VarMobilityHistoryReport:

4> for the newest entry of the PCell in the mobilityHistoryReport, include visitedPSCellInfoList from VarMobilityHistoryReport;

4> if the UE is configured with a PSCell:

5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:

6> set visitedCellId to the global cell identity or the physical cell identity and carrier frequency of the current PSCell:

6> set field timeSpent to the time spent in the current PSCell while being connected to the current PCell;

4> else:

5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:

6> set field timeSpent to the time spent without PSCell in the current PCell since last PSCell release or secondary cell radio link failure since connected to the current PCell in RRC_CONNECTED;
3> else if the UE supports pscell mobility history information:
4> if the UE is configured with a PSCell:
5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:
6> set visitedCellId to the global cell identity or the physical cell identity and carrier frequency of the current PSCell:
6> set field timeSpent to the time spent in the current PSCell while being connected to the current PCell;
4> else:
5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:
6> set field timeSpent to the time spent without PSCell in the current PCell since connected to the current PCell in RRC_CONNECTED;

The UE according to a next-generation mobile communication system may have the following characteristics in storing mobility history information and reporting it to the base station.

The UE may include whether the UE supports pscell mobility history information in the UE capability information message (UECapabilityInformation) and transmit the message to the base station. Instead, the UE supports storing mobility history information as in the above-described embodiment without separately informing the base station whether to store the pscell mobility history information, and transmits the RRC connection configuration complete message or RRC connection resume complete message with the mobilityHistoryAvail indicator only in case where there is the mobility history information in VarMobilityHistoryReport.

The UE may store information about the PSCell to which the UE connects or stays and the time when the PSCell is not present in the mobility history information and report it to the base station.

Figure 1G:
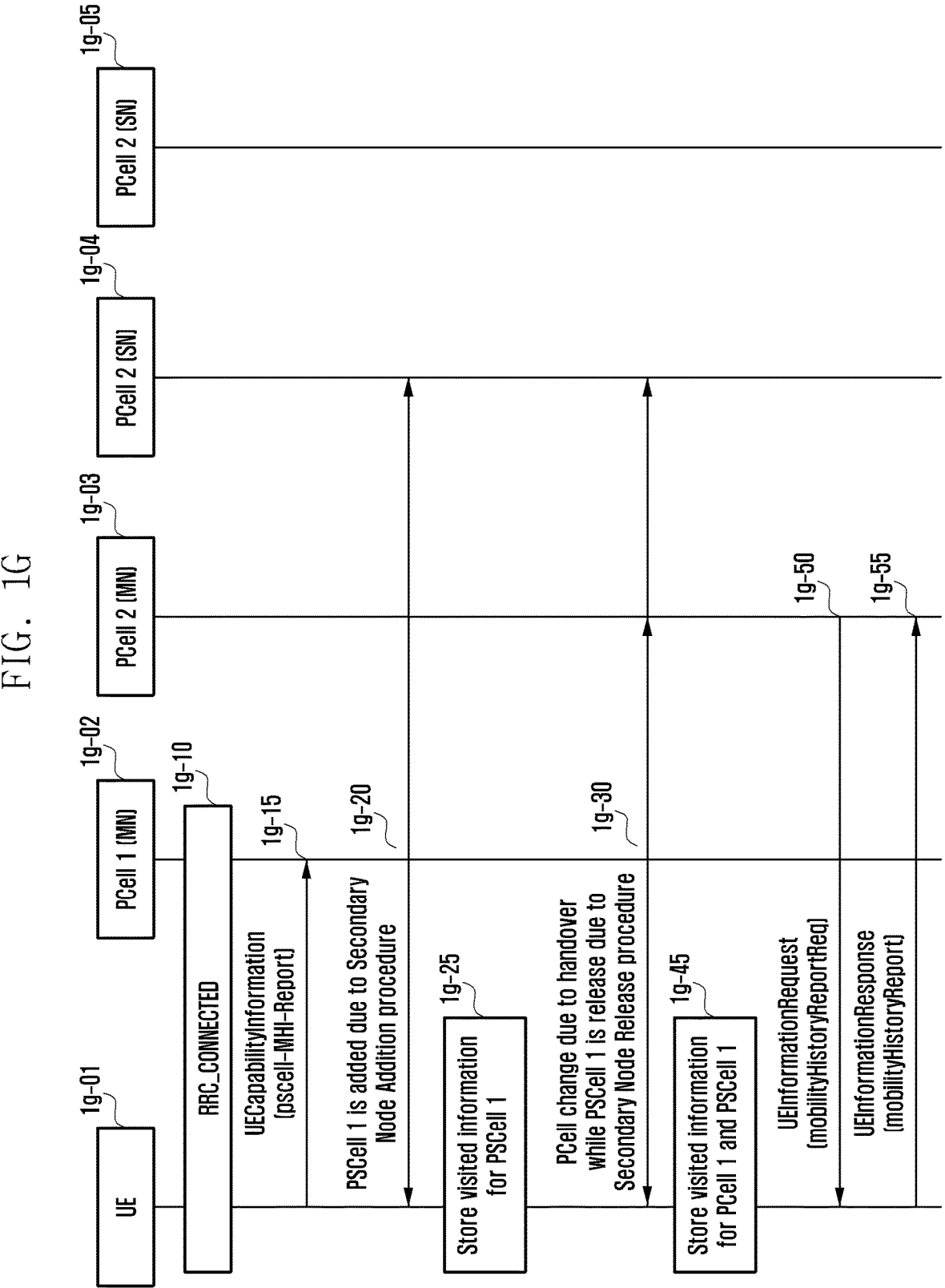
FIG. 1G is a diagram illustrating an operation of a UE for storing pscell mobility history information and reporting it to a base station in a next-generation mobile communication system according to an embodiment of the disclosure.

FIG. 1G is a diagram illustrating an operation of a UE for storing pscell mobility history information and reporting it to a base station in a next-generation mobile communication system according to an embodiment of the disclosure.

Referring to FIG. 1G, the UE 1g-01 may establish an RRC connection with the base station 1g-02 and enter the RRC connected mode (RRC_CONNECTED) (at operation 1g-10). The base station may be referred to as PCell 1 or master node (MN) base station.

At operation 1g-15, the UE 1g-01 may transmit a UE capability information message (UECapabilityInformation) to the PCell 1 1g-02. In case where the UE according to an embodiment of the disclosure has the ability to store pscell mobility history information and report it to the base station through the UE information response message (UEInformationResponse), the UE may transmit the UE capability information message including the pscell-MHI-Report indicator to the PCell 1 1g-02. The UE according to an embodiment of the disclosure may support storing the mobility history information of the above-described embodiment. For reference, the description of pscell-MHI-Report is as follows.

TABLE 2

| Definitions for parameters | Per | M | FDD-TDD DIFF | FR1-FR2 DIFF |
|---|---|---|---|---|
| pscell-MHI-Report-r17 Indicates whether the UE supports the storage of pscell mobility history information and the reporting in UEInformationResponse message as specified in TS 38.331 [9]. | UE | No | No | No |

At operation 1g-20, the master node (MN) 1g-02 may initiate a secondary node addition procedure to add a secondary node (SN) 1f-04. In the disclosure, the SN base station may be referred to as PSCell 1. Specific secondary node addition procedure may be performed according to Section 10.2 of TS 37.340. For example, the PSCell 1 1g-04 (or the PSCell 1 1g-05) may be added to the UE 1g-01 at operation 1g-20.

At operation 1g-25, the UE supports pscell mobility history information and may perform the following operations when the pscell 1 1g-04 is added.
1> If the UE supports pscell mobility history information and upon addition of a PSCell:
2> include an entry in visitedPSCellInfoList in variable VarMobilityHistoryReport possibly after performing the following, if necessary:
3> if visitedPSCellInfoListReport is available in the visitedCellInfoList in variable VarMobilityHistoryReport:
4> for the oldest PCell entry in visitedCellInfoList including visitedPSCellInfoListReport;
5> remove the oldest entry in the visitedPSCellInfoListReport;
3> else:
4> remove the oldest entry in visitedPSCellInfoList in variable VarMobilityHistoryReport;
2> for the included entry:
3> set the field timeSpent of the entry according to following:
4> if this is the first PSCell entry for the current PCell since entering the current PCell in RRC_CONNECTED:
5> include the entry as the time spent with no PSCell since entering the current PCell in RRC_CONNECTED;
4> else:
5> include the time spent with no PSCell since last PSCell release or include the time spent with no PSCell since last PSCell release while being connected to the current PCell;
At operation 1g-30, the terminal 1g-01 may change a PCell through a handover process. For example, the PCell 1 1g-02 connected to the UE 1g-01 may be changed to a PCell 2 1g-03 through a handover process. In addition, at operation 1g-30, the PSCell 1 1g-04 configured to the UE 1g-01 may be released through a secondary node release procedure. The specific secondary node release procedure or secondary node change procedure may be performed in accordance with Section 10.4 of TS 37.340.

At operation 1g-35, the UE may support pscell mobility history information and the UE according to an embodiment of the disclosure may perform the following operation when the PCell is changed (handover from the PCell 1 1g-02 to the PCell 2 1g-03) and the current PSCell 1 1g-04 is released.

1> Upon change of suitable cell, consisting of PCell in RRC_CONNECTED (for NR or E-UTRA cell) or serving cell in RRC_INACTIVE (for NR cell) or in RRC_IDLE (for NR or E-UTRA cell), to another NR or E-UTRA cell, or when entering any cell selection' state from 'camped normally' state in NR or LTE or when entering 'any cell selection' state from a suitable cell in RRC_CONNECTED state in NR or LTE:

2> include an entry in visitedCellInfoList of the variable VarMobilityHistoryReport possibly after removing the oldest entry, if necessary, according to following:

3> if the global cell identity of the previous PCell/ serving cell is available:

4> include the global cell identity of that cell in the field visitedCellId of the entry;

3> else:

4> include the physical cell identity and carrier frequency of that cell in the field visitedCellId of the entry;

3> set the field timeSpent of the entry as the time spent in the previous PCell/serving cell;

3> if the UE supports pscell mobility history information and if the UE continues to be connected to the same PSCell during the change of the PCell in RRC_CONNECTED; or 3> if the UE supports pscell mobility history information and if the UE changes PSCell, or attempts to change PSCell but fails, at the same time as the change of the PCell in RRC_CONNECTED; or 3> if the UE supports pscell mobility history information and if the PSCell is released at the same time as the change of the PCell (or during the change of PCell) in RRC_CONNECTED;

4> include an entry in visitedPSCellInfoList of the variable VarMobilityHistoryReport possibly after performing the following, if necessary:

5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the v

6> remove the oldest entry in visitedPSCellInfoList in variable VarMobilityHistoryReport;

4> for the included entry:

5> if the global cell identity of the PSCell (in case the UE continues to be connected to the same PSCell) or the previous PSCell (in case the UE changes PSCell, or at tempts to change PSCell but fails or in case of PSCell is released) is available:

6> include the global cell identity of that cell in the field visitedCellId of the entry;

5> else:

6> include the physical cell identity and carrier frequency of that cell in the field visitedCellId of the entry;

5> set the field timeSpent of the entry as the time spent in the PSCell, while being connected to previous PCell;

3> if the UE supports pscell mobility history information and if the UE was not configured with a PSCell at the time of change of PCell in RRC-_CONNECTED:

4> include an entry in visitedPSCellInfoList after performing the following, if necessary;

5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the vistedPSCellInfoListRepost;

5> else:

6> remove the oldest entry in visitedPSCellInfoList in variable VarMobilityHistoryReport;

4> for the included entry:

5> set the field timeSpent of the entry as the time without PSCell according to the following:

6> if the UE experienced a PSCell release or secondary cell radio link failure since entering the previous PCell in RRC_CONNECTED:

7> include the time spent with no PSCell since last PSCell release or secondary cell radio link failure since entering the previous PCell in RRC_CONNECTED;

6> else:

7> include the time spent with no PSCell since entering the previous PCell in RRC_CONNECTED;

3> if the UE supports pscell mobility history information and if visitedPSCellInfoList exists in VarMobilityHistoryReport:

4> include visitedPSCellInfoList in VarMobilityHistoryReport in the visitedPSCellInfoListReport within the entry of the visitedPSCellInfoList associated to the latest PCell entry;

4> remove visitedPSCellInfoList from the variable VarMobilityHistoryReport;

For example, the UE may record a cell identifier (global identity or physical cell identity and carrier frequency) for the PCell 1 1f-02, time information when the UE stays in the PCell 1, a cell identifier (global identity or physical cell identity and carrier frequency) for the PSCell 1 1f-04, and time information when the UE stays in the PSCell 1 while connected to the PCell 1. As the UE records the above information, the base station may identify the information about how long the UE has stayed in the PCell 1 and how long the UE has stayed in the PSCell 1 while staying in the PCell 1, so in the future, it is possible to determine how to configure dual connectivity for multiple UEs, and network operation can be managed efficiently accordingly.

At operation 1g-45, the UE 1g-01 may store visited information for PCell and PSCell 1.

At operation 1g-50, the UE 1g-01 may receive a UE information request message (UEInformationRequest) from the PCell 2 1g-03. In the above message, mobilityHistoryReportReq may be set to true.

At operation 1g-55, the UE 1g-01 may transmit the UE information response message (UEInformationResponse) to the PCell 2 1g-03. For example, in case where the mobilityHistoryReportReq included in the UE information request message received at operation 1g-50 is set to true, the UE may perform the following operations.

2> include the mobilityHistoryReport and set it to include visitedCellInfoList from VarMobilityHistoryReport;

2> include in the mobilityHistoryReport an entry for the current PCell, possibly after removing the oldest entry if required, and set its fields as follows:

3> set visitedCellId to the global cell identity or the physical cell identity and carrier frequency of the current PCell:

3> set field timeSpent to the time spent in the current PCell;

3> if the UE supports pscell mobility history information and if visitedPSCellInfoList is present in VarMobilityHistoryReport:

4> for the newest entry of the PCell in the mobilityHistoryReport, include visitedPSCellInfoList from VarMobilityHistoryReport;

4> if the UE is configured with a PSCell:

5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:

6> set visitedCellId to the global cell identity or the physical cell identity and carrier frequency of the current PSCell:

6> set field timeSpent to the time spent in the current PSCell while being connected to the current PCell;

4> else:

5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows: 6> set field timeSpent to the time spent without PSCell in the current PCell since last PSCell release or secondary cell radio link failure since connected to the current PCell in RRC_CONNECTED;

3> else if the UE supports pscell mobility history information:

4> if the UE is configured with a PSCell:

5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:

6> set visitedCellId to the global cell identity or the physical cell identity and carrier frequency of the current PSCell:

6> set field timeSpent to the time spent in the current PSCell while being connected to the current PCell;

4> else:

5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:

6> set field timeSpent to the time spent without PSCell in the current PCell since connected to the current PCell in RRC_CONNECTED;

The UE according to an embodiment of the disclosure can record mobility history information of PSCell released from the previous PCell when PCell change and PSCell release occur simultaneously.

Figure 1H:
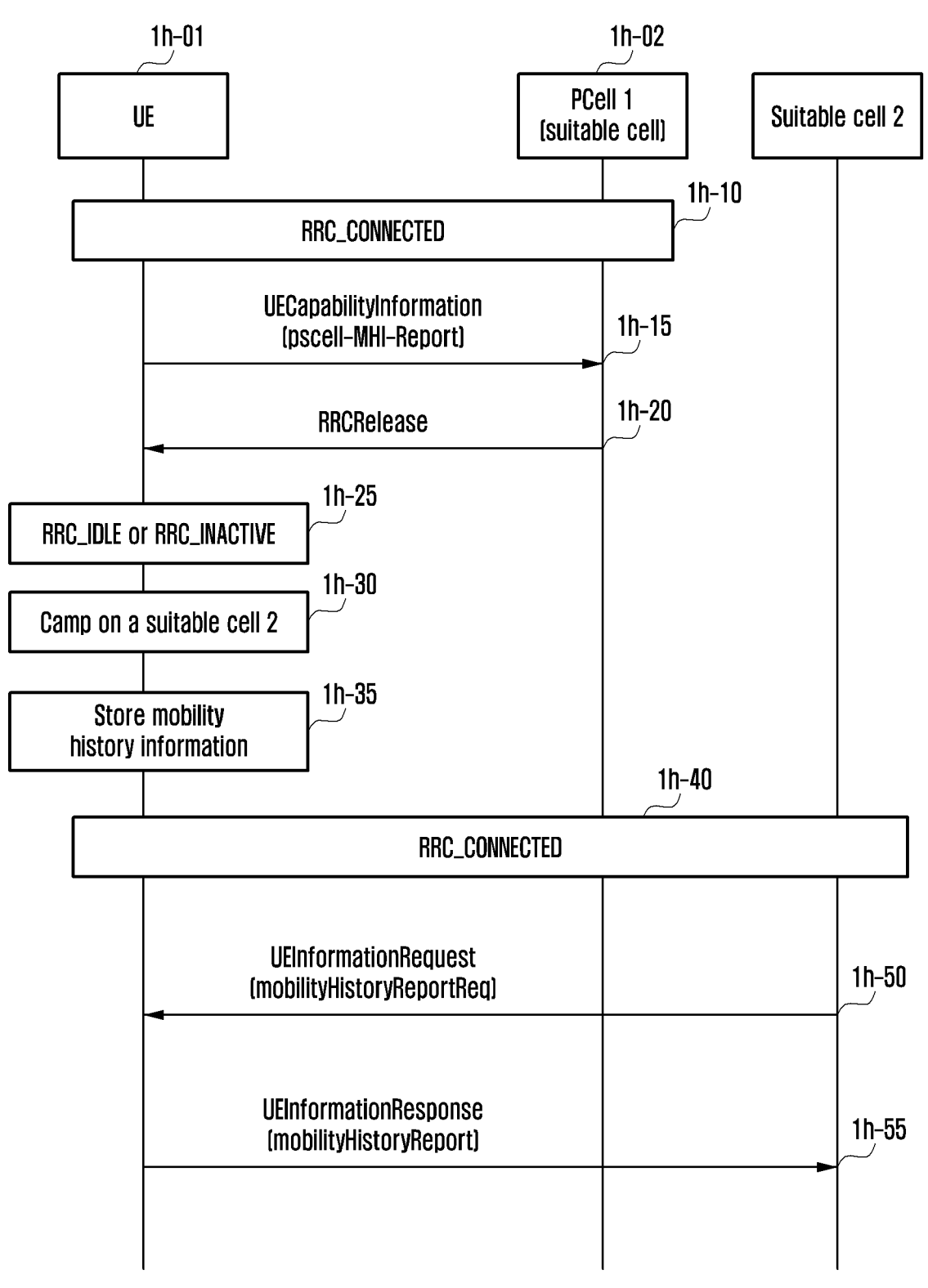
FIG. 1H is a diagram illustrating an operation of a UE for storing pscell mobility history information and reporting it to a base station in a next-generation mobile communication system according to an embodiment of the disclosure.

FIG. 1H is a diagram illustrating an operation of a UE for storing pscell mobility history information and reporting it to a base station in a next-generation mobile communication system according to an embodiment of the disclosure.

Referring to FIG. 1H, the UE 1h-01 may establish an RRC connection with the base station 1h-02 and enter the RRC connected mode (RRC_CONNECTED) (at operation 1h-10). For reference, a cell that has entered the RRC connection mode is a suitable cell and may be referred to as a PCell. For reference, the definition of suitable cell may be as follows (refer to 3GPP TS 38.304).

Suitable Cell:

For UE not operating in SNPN Access Mode, a cell is considered as suit able if the following conditions are fulfilled:

The cell is part of either the selected PLMN or the registered PLM N or PLMN of the Equivalent PLMN list, and for that PLMN either:

The PLMN-ID of that PLMN is broadcast by the cell with no associated CAG-IDs and CAG-only indication in the UE for that PLMN (TS 23.501 [10]) is absent or false;

Allowed CAG list in the UE for that PLMN (TS 23.501 [10]) includes a CAG-ID broadcast by the cell for that PLMN;

The cell selection criteria are fulfilled, see clause 5.2.3.2.

According to the latest information provided by NAS:

The cell is not barred, see clause 5.3.1;

The cell is part of at least one TA that is not part of the list of "Forbidden Tracking Areas for Roaming" (TS 22.011 [18]), which belongs to a PLMN that fulfils the first bullet above.

For UE operating in SNPN Access Mode, a cell is considered as suitable if the following conditions are fulfilled:

The cell is part of either the selected SNPN or the registered SNP N of the UE;

The cell selection criteria are fulfilled, see clause 5.2.3.2;

According to the latest information provided by NAS:

The cell is not barred, see clause 5.3.1;

The cell is part of at least one TA that is not part of the list of "Forbidden Tracking Areas for Roaming" which belongs to either the selected SNPN or the registered SNPN of the UE.

At operation 1h-15, the UE 1h-01 may transmit a UE capability information message (UECapabilityInformation) to the PCell 1 1h-02. In case where the UE according to an embodiment of the disclosure has the ability to store pscell mobility history information and report it to the base station through the UE information response message (UEInformationResponse), the UE may transmit the UE capability information message including the pscell-MHI-Report indicator to the PCell 1 1h-02. The UE according to an embodiment of the disclosure may support storing the mobility history information of the above-described embodiment. For reference, the description of pscell-MHI-Report is as follows.

TABLE 3

| Definitions for parameters | Per | M | FDD-TDD DIFF | FR1-FR2 DIFF |
|---|---|---|---|---|
| pscell-MHI-Report-r17 Indicates whether the UE supports the storage of pscell mobility history information and the reporting in UEInformationResponse message as specified in TS 38.331 [9]. | UE | No | No | No |

At operation 1h-20, the base station 1h-02 may transmit an RRC connection release message (RRCRelease) to the UE 1h-01.

At operation 1h-25, the UE 1h-01 may transition to RRC idle mode (RRC_IDLE) or RRC inactive mode (RRC_I-NACTIVE).

At operation 1h-30, the UE 1h-01 may camp on suitable cell 2 1h-03 through a cell selection process. For reference, the UE is in a camped normally state at this time.

At operation 1h-35, the UE 1h-01 may store the mobility history information as follows.

1> Upon change of suitable cell, consisting of PCell in RRC_CONNECTED (for NR or E-UTRA cell) or serving cell in RRC_INACTIVE (for NR cell) or in RRC_IDLE (for NR or E-UTRA cell), to another NR or E-UTRA cell, or when entering any cell selection' state from 'camped normally' state in NR or LTE or when entering 'any cell selection' state from a suitable cell in RRC_CONNECTED state in NR or LTE:

2> include an entry in visitedCellInfoList of the variable VarMobilityHistoryReport possibly after removing the oldest entry, if necessary, according to following:

3> if the global cell identity of the previous PCell/serving cell is available:

4> include the global cell identity of that cell in the field visitedCellId of the entry;

3> else:

4> include the physical cell identity and carrier frequency of that cell in the field visitedCellId of the entry;

3> set the field timeSpent of the entry as the time spent in the previous PCell/serving cell;

3> if the UE supports pscell mobility history information and if the UE continues to be connected to the same PSCell during the change of the PCell in RRC_CONNECTED; or 3> if the UE supports pscell mobility history information and if the UE changes PSCell, or attempts to change PSCell but fails, at the same time as the change of the PCell in RRC_CONNECTED:

4> include an entry in visitedPSCellInfoList of the variable VarMobilityHistoryReport possibly after performing the following, if necessary:

5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the visitedPSCellInfoListReport;

5> else:

6> remove the oldest entry in visitedPSCellInfoList in variable VarMobilityHistoryReport;

4> for the included entry:

5> if the global cell identity of the PSCell (in case the UE continues to be connected to the same PSCell) or the previous PSCell (in case the UE changes PSCell, or at tempts to change PSCell but fails) is available:

6> include the global cell identity of that cell in the field visitedCellId of the entry;

5> else:

6> include the physical cell identity and carrier frequency of that cell in the field visitedCellId of the entry;

5> set the field timeSpent of the entry as the time spent in the PSCell, while being connected to previous PCell;

3> if the UE supports pscell mobility history information and if the UE was not configured with a PSCell at the time of change of PCell in RRC-_CONNECTED; or 3> if the UE supports pscell mobility history information and upon 'camped normally' state in NR (in RRC_IDLE or RRC_INACTIVE) or E-UTRA (in RRC_IDLE) while previously in RRC_CON-NECTED state NR or LTE while not connected to a PSCell:

4> include an entry in visitedPSCellInfoList after performing the following, if necessary;

5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the visitedPSCellInfoListReport;

5> else:

6> remove the oldest entry in visitedPSCellInfoList in variable VarMobilityHistoryReport;

4> for the included entry:

5> set the field timeSpent of the entry as the time without PSCell according to the following:

6> if the UE experienced a PSCell release since entering the previous PCell in RRC_CON-NECTED:

7> include the time spent with no PSCell since last PSCell release while connecting to the previous PCell in RRC_CONNECTED;

7> include the time spent with no PSCell since entering the previous PCell in RRC_CON-NECTED;

3> if the UE supports pscell mobility history information and if visitedPSCellInfoList exists in VarMobilityHistoryReport:

4> include visitedPSCellInfoList in VarMobilityHistoryReport in the visitedPSCellInfoListReport within the entry of the visitedPSCellInfoList associated to the latest PCell entry;

4> remove visitedPSCellInfoList from the variable VarMobilityHistoryReport;

For example, the UE may record a cell identifier (global cell identity or physical cell identity and carrier frequency) for the previous PCell 1 1h-02, the time when the UE stays in the previous PCell 1, and time when the PSCell is not present after transitioning to RRC connection mode in PCell 1. In addition, the UE may perform the following operations.

3> if the UE supports pscell mobility history information and if visitedPSCellInfoList exists in VarMobilityHistoryReport:

4> include visitedPSCellInfoList in VarMobilityHistoryReport in the visitedPSCellInfoListReport within the entry of the visitedPSCellInfoList associated to the latest PCell entry;

4> remove visitedPSCellInfoList from the variable VarMobilityHistoryReport;

Therefore, when a suitable cell is changed, the UE may record the mobility information of the previous PCell/serving cell and record the time when the PSCell is not present in the corresponding PCell in visitedCellInfo of the corresponding PCell.

For reference, in case where the UE performs the operations according to the procedure below of the related art, the UE may not record the mobility information of the previous PCell and the time when the PSCell is not present in the previous PCell together.

> 1> if the UE supports pscell mobility history information and upon entering 'camped normally' state in NR (in RRC_IDLE or RRC_INACTIVE) or E-UTRA (in RRC_IDLE) while previously in RRC_CONNECTED state NR or LTE while not connected to a PSCell:
>> 2> include an entry in visitedPSCellInfoList after performing the following, if necessary;
>>> 3> if visitedPSCellInfoListReport is available in the visitedCellInfoList in variable VarMobilityHistoryReport:
>>>> 4> for the oldest PCell entry in visitedCellInfoList including visitedPSCellInfoListReport;
>>>>> 5> remove the oldest entry in the visitedPSCellInfoListReport;
>>> 3> else:
>>>> 4> remove the oldest entry in visitedPSCellInfoList in variable VarMobilityHistoryReport;

At operation 1h-40, the UE 1h-01 may transition to the RRC connection mode by establishing an RRC connection with suitable cell 2 1h-03. In other words, suitable cell 2 1h-03 may be PCell 2.

At operation 1h-50, the UE 1h-01 may receive a UE information request message (UEInformationRequest) from the PCell 2 1h-03. In the above message, mobilityHistoryReportReq may be set to true.

At operation 1h-55, the UE 1h-01 may transmit a UE information response message (UEInformationResponse) to the PCell 2 1h-03. For example, in case where the mobilityHistoryReportReq included in the UE information request message received at operation 1h-50 is set to true, the UE may perform the following operations.

Figure 1I:
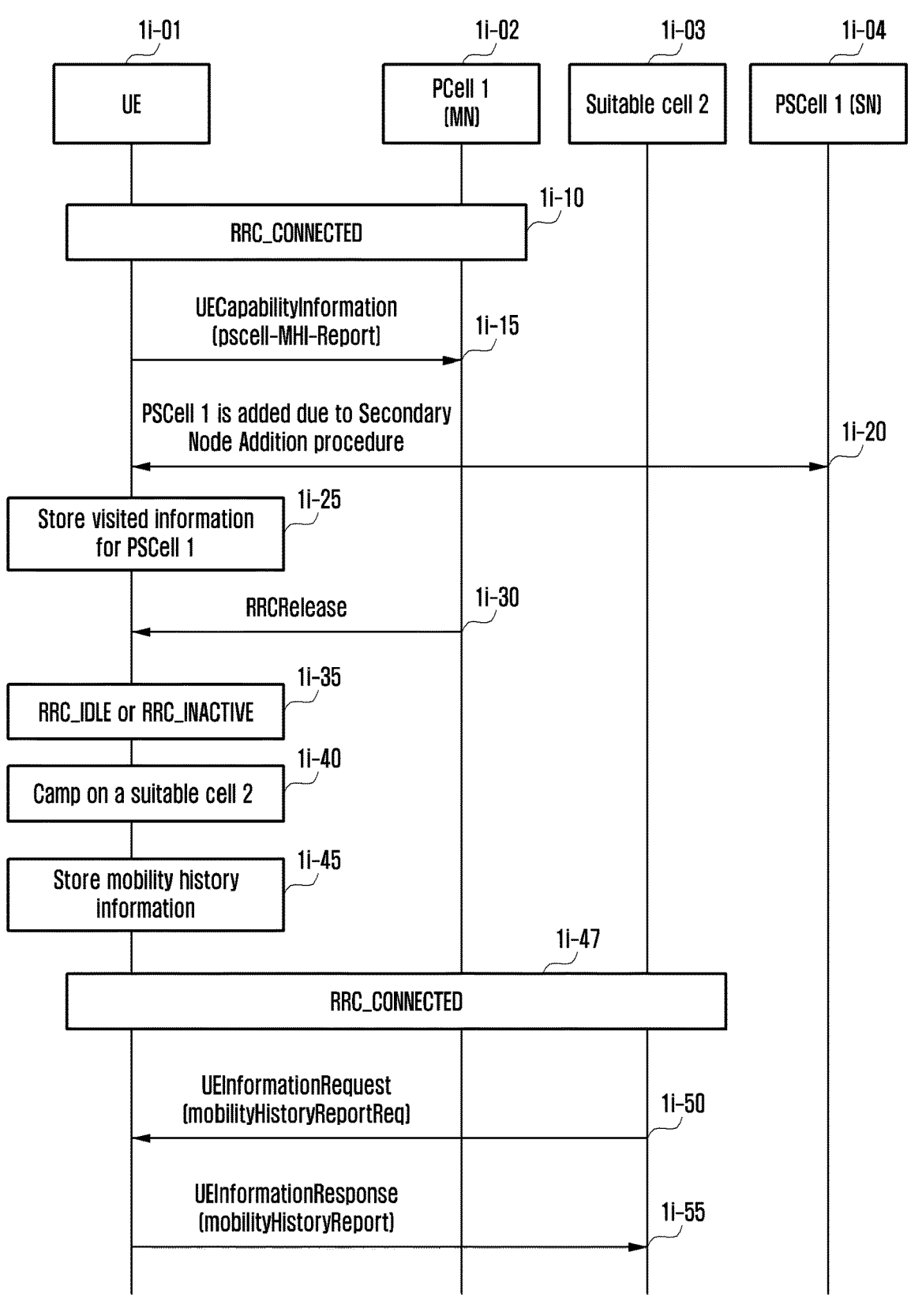
FIG. 1I is a diagram illustrating an operation of a UE for storing pscell mobility history information and reporting it to a base station in a next-generation mobile communication system according to an embodiment of the disclosure.

> 2> include the mobilityHistoryReport and set it to include visitedCellInfoList from VarMobilityHistoryReport;
> 2> include in the mobilityHistoryReport an entry for the current PCell, possibly after removing the oldest entry if required, and set its fields as follows:
>> 3> set visitedCellId to the global cell identity or the physical cell identity and carrier frequency of the current PCell:
>> 3> set field timeSpent to the time spent in the current PCell;
>> 3> if the UE supports pscell mobility history information and if visitedPSCellInfoList is present in VarMobilityHistoryReport:
>>> 4> for the newest entry of the PCell in the mobilityHistoryReport, include visitedPSCellInfoList from VarMobilityHistoryReport;
>>> 4> if the UE is configured with a PSCell:
>>>> 5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:
>>>>> 6> set visitedCellId to the global cell identity or the physical cell identity and carrier frequency of the current PSCell:
>>>>> 6> set field timeSpent to the time spent in the current PSCell while being connected to the current PCell;
>>> 4> else:

>>>> 5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:
>>>>> 6> set field timeSpent to the time spent without PSCell in the current PSCell since last PSCell release or secondary cell radio link failure since connected to the current PCell in RRC_CONNECTED;
> 3> else if the UE supports pscell mobility history information:
>> 4> if the UE is configured with a PSCell:
>>> 5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:
>>>> 6> set visitedCellId to the global cell identity or the physical cell identity and carrier frequency of the current PSCell:
>>>> 6> set field timeSpent to the time spent in the current PSCell while being connected to the current PCell;
>> 4> else:
>>> 5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:
>>>> 6> set field timeSpent to the time spent without PSCell in the current PCell since connected to the current PCell in RRC_CONNECTED;

FIG. 1I is a diagram illustrating an operation of a UE for storing pscell mobility history information and reporting it to a base station in a next-generation mobile communication system according to an embodiment of the disclosure.

Referring to FIG. 1I, the UE 1i-01 may establish an RRC connection with the base station 1i-02 and enter the RRC connected mode (RRC_CONNECTED) (at operation 1i-10). For reference, a cell that has entered the RRC connection mode is a suitable cell and may be referred to as a PCell. For reference, the definition of suitable cell may be as follows (refer to 3GPP TS 38.304).

Suitable Cell:

For UE not operating in SNPN Access Mode, a cell is considered as suit able if the following conditions are fulfilled:

The cell is part of either the selected PLMN or the registered PLM N or PLMN of the Equivalent PLMN list, and for that PLMN either:

The PLMN-ID of that PLMN is broadcast by the cell with no associated CAG-IDs and CAG-only indication in the UE for that PLMN (TS 23.501 [10]) is absent or false;

Allowed CAG list in the UE for that PLMN (TS 23.501 [10]) includes a CAG-ID broadcast by the cell for that PLMN;

The cell selection criteria are fulfilled, see clause 5.2.3.2.

According to the latest information provided by NAS:

The cell is not barred, see clause 5.3.1;

The cell is part of at least one TA that is not part of the list of "Forbidden Tracking Areas for Roaming" (TS 22.011 [18]), which belongs to a PLMN that fulfils the first bullet above.

For UE operating in SNPN Access Mode, a cell is considered as suitable if the following conditions are fulfilled:

The cell is part of either the selected SNPN or the registered SNP N of the UE;

The cell selection criteria are fulfilled, see clause 5.2.3.2;

According to the latest information provided by NAS:

The cell is not barred, see clause 5.3.1;

The cell is part of at least one TA that is not part of the list of "Forbidden Tracking Areas for Roaming" which belongs to either the selected SNPN or the registered SNPN of the UE.

At operation 1i-15, the UE 1i-01 may transmit a UE capability information message (UECapabilityInformation) to the PCell 1 1i-02. In case where the UE according to an embodiment of the disclosure has the ability to store pscell mobility history information and report it to the base station through the UE information response message (UEInformationResponse), the UE may transmit the UE capability information message including the pscell-MHI-Report indicator to the PCell 1 1i-02. The UE according to an embodiment of the disclosure may support storing the mobility history information of the above-described embodiment. For reference, the description of pscell-MHI-Report is as follows.

TABLE 4

| Definitions for parameters | Per | M | FDD-TDD DIFF | FR1-FR2 DIFF |
|---|---|---|---|---|
| pscell-MHI-Report-r17 Indicates whether the UE supports the storage of pscell mobility history information and the reporting in UEInformationResponse message as specified in TS 38.331 [9]. | UE | No | No | No |

At operation 1i-20, the master node (MN) 1i-02 may initiate the secondary node addition procedure to add a secondary node (SN) 1i-04. In the disclosure, the SN base station may be referred to as PSCell 1. Specific secondary node addition procedure may be performed according to Section 10.2 of TS 37.340. For example, PSCell 1 1i-04 may be added to the UE 1i-01 at operation 1i-20.

At operation 1i-25, the UE supports pscell mobility history information and may perform the following operations when the PSCell 1 1i-04 is added.

1> If the UE supports pscell mobility history information and upon addition of a PSCell:
  2> include an entry in visitedPSCellInfoList in variable VarMobilityHistoryReport possibly after performing the following, if necessary:
    3> if visitedPSCellInfoListReport is available in the visitedCellInfoList in variable VarMobilityHistoryReport:
      4> for the oldest PCell entry in visitedCellInfoList including visitedPSCellInfoListReport;
        5> remove the oldest entry in the visitedPSCellInfoListReport;
    3> else:
      4> remove the oldest entry in visitedPSCellInfoList in variable VarMobilityHistoryReport;
  2> for the included entry:

3> set the field timeSpent of the entry according to following:
      4> if this is the first PSCell entry for the current PCell since entering the current PCell in RRC_CONNECTED:
        5> include the entry as the time spent with no PSCell since entering the current PCell in RRC_CONNECTED;
      4> else:
        5> include the time spent with no PSCell since last PSCell release or include the time spent with no PSCell since last PSCell release while being connected to the current PCell;

At operation 1i-30, the base station 1i-02 may transmit an RRC connection release message (RRCRelease) to the UE 1i-01.

At operation 1i-35, the UE 1i-01 may transition to RRC idle mode (RRC_IDLE) or RRC inactive mode (RRC_INACTIVE).

At operation 1i-40, the UE 1i-01 may camp on suitable cell 2 1i-03 through a cell selection process. For reference, the UE is in a camped normally state at this time.

At operation 1i-45, the UE 1i-01 may store the mobility history information as follows.

1> Upon change of suitable cell, consisting of PCell in RRC_CONNECTED (for NR or E-UTRA cell) or serving cell in RRC_INACTIVE (for NR cell) or in RRC_IDLE (for NR or E-UTRA cell), to another NR or E-UTRA cell, or when entering any cell selection' state from 'camped normally' state in NR or LTE or when entering 'any cell selection' state from a suitable cell in RRC_CONNECTED state in NR or LTE:
  2> include an entry in visitedCellInfoList of the variable VarMobilityHistoryReport possibly after removing the oldest entry, if necessary, according to following:
    3> if the global cell identity of the previous PCell/serving cell is available:
      4> include the global cell identity of that cell in the field visitedCellId of the entry;
    3> else:
      4> include the physical cell identity and carrier frequency of that cell in the field visitedCellId of the entry;
    3> set the field timeSpent of the entry as the time spent in the previous PCell/serving cell;
    3> if the UE supports pscell mobility history information and if the UE continues to be connected to the same PSCell during the change of the PCell in RRC_CONNECTED; or
    3> if the UE supports pscell mobility history information and if the UE changes PSCell, or attempts to change pscell but fails, at the sa me time as the change of the PCell in RRC_CONNECTED; or
    3> if the UE supports pscell mobility history information and upon entering 'camped normally' state in NR (in RRC_IDLE or RRC_INACTIVE) or E-UTRA (in RRC_IDLE) while previously in RRC_CONNECTED state in NR or LTE while being connected to a PSCell;
      4> include an entry in visitedPSCellInfoList of the variable VarMobilityHistoryReport possibly after performing the following, if necessary:
        5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the visitedPSCellInfoListReport;

4> for the included entry:

5> if the global cell identity of the PSCell (in case the UE continues to be connected to the same pscell) or the previous PSCell (in case the UE changes pscell, or attempts to change PSCell but fails or upon entering 'camped normally' state in NR (in RRC_IDLE or in RRC_INACTIVE) or E-UTRA (in RRC_IDLE)) is available:

6> include the global cell identity of that cell in the field visitedCellId of the entry;

5> else:

6> include the physical cell identity and carrier frequency of that cell in the field visitedCellId of the entry;

5> set the field timeSpent of the entry as the time spent in the PSCell, while being connected to previous PCell;

3> if the UE supports pscell mobility history information and if the UE was not configured with a PSCell at the time of change of PCell in RRC_CONNECTED:

4> include an entry in visitedPSCellInfoList after performing the following, if necessary;

5> if visitedPSCellInfoListReport is available in the visitedCellInfoList in variable VarMobilityHistoryReport:

6> for the oldest PCell entry in visitedCellInfoList including visitedPSCellInfoListReport;

7> remove the oldest entry in the visitedPSCellInfoListReport;

5> else:

6> remove the oldest entry in vistedpscellInfoList in variable VarMobilityHistoryReport;

4> for the included entry:

5> set the field timeSpent of the entry as the time without PSCell according to the following:

6> if the UE experienced a PSCell release since entering the previous PCell in RRC_CONNECTED:

7> include the time spent with no PSCell since last PSCell release while connecting to the previous PCell in RRC_CONNECTED;

6> else:

7> include the time spent with no PSCell since entering the previous PCell in RRC_CONNECTED;

3> if the UE supports pscell mobility history information and if visitedPSCellInfoList exists in VarMobilityHistoryReport:

4> include visitedPSCellInfoList in VarMobilityHistoryReport in the visitedPSCellInfoListReport within the entry of the visitedCellInfoList associated to the latest PCell entry;

4> remove visitedPSCellInfoList from the variable VarMobilityHistoryReport;

For example, the UE may record a cell identifier (global cell identity or physical cell identity and carrier frequency) for the previous PCell 1 1i-02, the time when the UE stays in the previous PCell 1, a PSCell 1 identifier (global cell identity or physical cell identity and carrier frequency) configured while in the RRC connection mode in the PCell 1, and the time when the UE stays in the corresponding PSCell 1 while being connected to the PCell 1. In addition, the UE may perform the following operations.

3> if the UE supports pscell mobility history information and if visitedPSCellInfoList exists in VarMobilityHistoryReport:

4> include visitedPSCellInfoList in VarMobilityHistoryReport in the visitedPSCellInfoListReport within the entry of the visitedCellInfoList associated to the latest PCell entry;

4> remove visitedPSCellInfoList from the variable VarMobilityHistoryReport;

Therefore, when a suitable cell is changed, the UE may record the mobility history information of the previous PCell/serving cell and PSCell and record the pscell mobility history information for the corresponding PCell in the visitedCellInfo of the corresponding PCell.

At operation 1i-47, the UE 1i-01 may transition to the RRC connection mode by establishing an RRC connection with suitable cell 2 1i-03. In other words, suitable cell 2 1i-03 may be PCell 2.

At operation 1i-50, the UE 1i-01 may receive a UE information request message (UEInformationRequest) from the PCell 2 1i-03. In the above message, mobilityHistoryReportReq may be set to true.

At operation 1i-55, the UE 1i-01 may transmit a UE information response message (UEInformationResponse) to the PCell 2 1i-03. For example, in case where the mobilityHistoryReportReq included in the UE information request message received at operation 1i-50 is set to true, the UE may perform the following operations.

Figure 1J:
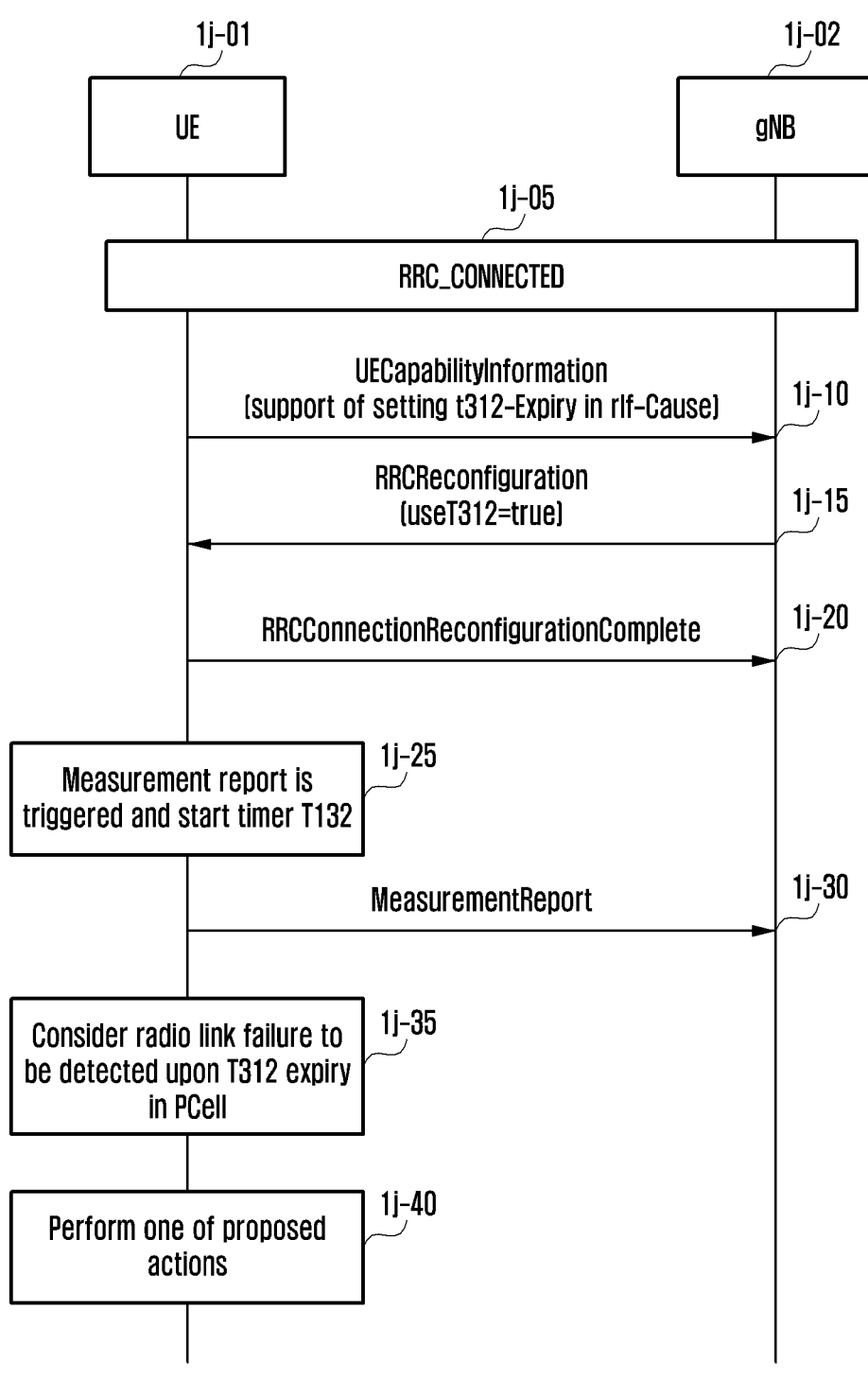
FIG. 1J is a diagram illustrating a UE operation when a UE detects radio link failure due to expiration of a T312 timer in a PCell in a next-generation mobile communication system according to an embodiment of the disclosure.

2> include the mobilityHistoryReport and set it to include visitedCellInfoList from VarMobilityHistoryReport;

2> include in the mobilityHistoryReport an entry for the current PCell, possibly after removing the oldest entry if required, and set its fields as follows:

3> set visitedCellId to the global cell identity or the physical cell identity and carrier frequency of the current PCell:

3> set field timeSpent to the time spent in the current PCell;

3> if the UE supports pscell mobility history information and if visitedPSCellInfoList is present in VarMobilityHistoryReport:

4> for the newest entry of the PCell in the mobilityHistoryReport, include visitedPSCellInfoList from VarMobilityHistoryReport;

4> if the UE is configured with a PSCell:

5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:

6> set visitedCellId to the global cell identity or the physical cell identity and carrier frequency of the current PSCell:

6> set field timeSpent to the time spent in the current PSCell while being connected to the current PCell;

4> else:

5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:

6> set field timeSpent to the time spent without PSCell in the current PCell since last PSCell release or secondary cell radio link failure since connected to the current PCell in RRC_CONNECTED;

3> else if the UE supports pscell mobility history information:

4> if the UE is configured with a PSCell:

5> for the newest entry of the PCell in the mobilityHistoryReport, include the current PSCell information in the visitedPSCellInfoListReport, possibly after removing the oldest PSCell entry of a PCell in the mobilityHistoryReport, if required, and set its fields as follows:

6> set visitedCellId to the global cell identity or the physical cell identity and carrier frequency of the current PSCell:

6> set field timeSpent to the time spent in the current PSCell while being connected to the current PCell;

4> else:

5> for the newest entry of the PCell in the mobilityHistoryReport, include a new entry in the visitedPSCellInfoListReport, possibly after removing the oldest PSCell entry of a PCell in the mobilityHistoryReport, if required, and set its fields as follows:

6> set field timeSpent to the time spent without PSCell in the current PCell since connected to the current PCell in RRC_CONNECTED;

FIG. 1J is a diagram illustrating a UE operation when a UE detects radio link failure due to expiration of a T312 timer in a PCell in a next-generation mobile communication system according to an embodiment of the disclosure.

Referring to FIG. 1J, the UE 1j-01 may establish an RRC connection with the base station 1j-02 and be in RRC connection mode (at operation 1j-05).

At operation 1j-10, the UE 1j-01 may transmit a UE capability information message (UECapabilityInformation) to the base station 1j-02. The message may include an indicator indicating the ability to configure rlf-Cause to t3 12-Expiry when detecting radio link failure due to the expiration of a T312 timer in the PCell.

At operation 1j-15, the base station 1j-02 may transmit an RRC connection reconfiguration message (RRCReconfiguration) to the UE 1j-01. The message may include measurement configuration information (measConfig). The measurement configuration information may include report measurement configuration information (ReportConfigNR). In the report measurement configuration information, EventTriggerConfig may be configured to reportType, and useT312 may be configured to TRUE in the EventTriggerConfig.

At operation 1j-20, the UE 1j-01 may transmit an RRC connection reconfiguration complete message (RRCReconfigurationComplete) to the base station 1j-02.

At operation 1j-25, the UE 1j-01 may trigger a measurement report. Specifically, the UE may trigger a measurement report when the following conditions are satisfied. For reference, at operation 1j-25, the UE may drive the T312 timer.

5.5.4.1 General

If AS security has been activated successfully, the UE shall:

1> for each measId included in the measIdList within VarMeasConfig:

2> if the corresponding reportConfig includes a reportType set to eventTriggered or periodical:

3> if the corresponding measObject concerns NR:

4> if the corresponding reportConfig includes measRSSI-ReportConfig:

5> consider the resource indicated by the rmtc-Config on the associated frequency to be applicable;

4> if the eventA1 or eventA2 is configured in the corresponding reportConfig:

5> consider only the serving cell to be applicable;

4> if the eventA3 or eventA5 is configured in the corresponding reportConfig:

5> if a serving cell is associated with a measObjectNR and neighbours are associated with another measObjectNR, consider any serving cell associated with the other measObjectNR to be a neighbouring cell as well;

4> if corresponding reportConfig includes reportType set to periodical; or

4> for measurement events other than eventA1 or eventA2:

5> if useWhiteCellList is set to true:

6> consider any neighbouring cell detected based on parameters in the associated measObject 6> consider any neighbouring cell detected based on parameters in the associated measObject NR to be applicable when the concerned cell is not included in the blackCellsToAddModList defined within the VarMeasConfig for this measId;

3> else if the corresponding measObject concerns E-UTRA:

4> if eventB1 or eventB2 is configured in the corresponding reportConfig:

5> consider a serving cell, if any, on the associated E-UTRA frequency as neighbour cell;

4> consider any neighbouring cell detected on the associated frequency to be applicable when the concerned cell is not included in the blackCellsToAddModListEUTRAN defined within the VarMeasConfig for this measId;

3> else if the corresponding measObject concerns UTRA-FD D:

4> if eventB1-UTRA-FDD or eventB2-UTRA-FDD is configured in the corresponding reportConfig; or 4> if corresponding reportConfig includes reportType set to periodical:

5> consider a neighbouring cell on the associated frequency to be applicable when the concerned cell is included in the cellsToAddModList defined within the VarMeasConfig for this measId;

2> else if the corresponding reportConfig includes a reportType set to reportCGI:

3> consider the cell detected on the associated measObject which has a physical cell identity matching the value of the cellForWhichTo ReportCGI included in the corresponding reportConfig within the VarMeasConfig to be applicable;

2> else if the corresponding reportConfig includes a reportType set to reportSFTD:

3> if the corresponding measObject concerns NR:
    4> if the reportSFTD-Meas is set to true:
        5> consider the NR PSCell to be applicable;
    4> else if the reportSFTD-NeighMeas is included:
        5> if cellsForWhichToReportSFTD is configured
           in the corresponding reportConfig:
           6> consider any NR neighbouring cell detected
           on the associated measObjectNR which has a
           physical cell identity that is included in the
           cellsForWhichToReportSFTD to be applicable;
        5> else:
           6> consider up to 3 strongest NR neighbouring
           cells detected based on parameters in the asso-
           ciated measObjectNR to be applicable when the
           concerned cells are not included in the black-
           CellsToAddModList defined within the
           VarMeasConfig for this measId;
3> else if the corresponding measObject concerns
    E-UTRA:
    4> if the reportSFTD-Meas is set to true:
        5> consider the E-UTRA PSCell to be applicable;
2> else if the corresponding reportConfig includes a
    reportType set to cli-Periodical or cli-EventTriggered:
    3> consider all CLI measurement resources included in
        the corresponding measObject to be applicable;
2> if the corresponding reportConfig concerns the report-
    ing for NR sidelink communication (i.e., reportCon-
    figNR-SL):
    3> consider the transmission resource pools indicated
        by the tx-PoolMeasToAddModList defined within
        the VarMeasConfig for this measId to be applicable;
2> if the reportType is set to eventTriggered and if the
    entry condition applicable for this event, i.e., the event
    corresponding with the eventId of the corresponding
    reportConfig within VarMeasConfig, is fulfilled for one
    or more applicable cells for all measurements after
    layer 3 filtering taken during timeToTrigger defined for
    this event within the VarMeasConfig, while the
    VarMeasReportList does not include a measurement
    reporting entry for this measId (a first cell triggers the
    event):
    3> include a measurement reporting entry within the
        VarMeasReportList for this measId;
    3> set the numberOfReportsSent defined within the
        VarMeasReportList for this measId to 0;
    3> include the concerned cell(s) in the cellsTrig-
        geredList defined within the VarMeasReportList for
        this measId;
    3> if useT312 is set to true in reportConfig for this
        event:
        4> if T310 for the corresponding SpCell is running;
           and
        4> if T312 is not running for corresponding SpCell:
           5> start timer T312 for the corresponding SpCell
           with the value of T312 configured in the cor-
           responding measObjectNR;
    3> initiate the measurement reporting procedure, as
        specified in 5.5.5;
    4> if T312 is not running for corresponding SpCell:
        5> start timer T312 for the corresponding SpCell
           with the value of T312 configured in the cor-
           responding measObjectNR;
3> initiate the measurement reporting procedure, as
    specified in 5.5.5;
2> else if the reportType is set to eventTriggered and if the
    entry condition applicable for this event, i.e., the event
    corresponding with the eventId of the corresponding
    reportConfig within VarMeasConfig, is fulfilled for one
    or more applicable cells not included in the cellsTrig-
    geredList for all measurements after layer 3 filtering
    taken during timeToTrigger defined for this event
    within the VarMeasConfig (a subsequent cell triggers
    the event):

3> set the numberOfReportsSent defined within the
    VarMeasReportList for this measId to 0;
3> include the concerned cell(s) in the cellsTrig-
    geredList defined within the VarMeasReportList for
    this measId;
3> if useT312 is set to true in reportConfig for this
    event:
    4> if T310 for the corresponding SpCell is running;
        and
    4> if T312 is not running for corresponding SpCell:
        5> start timer T312 for the corresponding SpCell
           with the value of T312 configured in the cor-
           responding measObjectNR;
3> initiate the measurement reporting procedure, as
    specified in 5.5.5;
2> else if the reportType is set to eventTriggered and if the
    leaving condition applicable for this event is fulfilled
    for one or more of the cells included in the cellsTrig-
    geredList defined within the VarMeasReportList for
    this measId for all measurements after layer 3 filtering
    taken during timeToTrigger defined within the
    VarMeasConfig for this event:
    3> remove the concerned cell(s) in the cellsTrig-
        geredList defined within the VarMeasReportList for
        this measId;
    3> if reportOnLeave is set to true for the corresponding
        reporting configuration:
        4> initiate the measurement reporting procedure, as
           specified in 5.5.5;
    3> if the cellsTriggeredList defined within the
        VarMeasReportList for this measId is empty:
        4> remove the measurement reporting entry within
           the VarMeasReportList for this measId;
        4> stop the periodical reporting timer for this
           measId, if running;
2> else if the reportType is set to eventTriggered and if the
    entry condition applicable for this event, i.e., the event
    corresponding with the eventId of the corresponding
    reportConfig within VarMeasConfig, is fulfilled for one
    or more applicable transmission resource pools for all
    measurements taken during timeToTrigger defined for
    this event within the VarMeasConfig, while the
    VarMeasReportList does not include an measurement
    reporting entry for this measId (a first transmission
    resource pool triggers the event):
    3> include a measurement reporting entry within the
        VarMeasReportList for this measId;
    3> set the numberOfReportsSent defined within the
        VarMeasReportList for this measId to 0;
    3> include the concerned transmission resource pool(s)
        in the poolsTriggeredList defined within the
        VarMeasReportList for this measId;
    3> initiate the measurement reporting procedure, as
        specified in 5.5.5;
2> else if the reportType is set to eventTriggered and if the
    entry condition applicable for this event, i.e., the event
    corresponding with the eventId of the corresponding
    reportConfig within VarMeasConfig, is fulfilled for one
    or more applicable transmission resource pools not
    included in the poolsTriggered List for all measure-
    ments taken during timeToTrigger defined for this
    event within the VarMeasConfig (a subsequent trans-
    mission resource pool triggers the event):
    3> set the numberOfReportsSent defined within the
        VarMeasReportList for this measId to 0;

3> include the concerned transmission resource pool(s) in the poolsTriggeredList defined within the VarMeasReportList for this measId;

3> initiate the measurement reporting procedure, as specified in 5.5.5;

2> else if the reportType is set to eventTriggered and if the leaving condition applicable for this event is fulfilled for one or more applicable transmission resource pools included in the poolsTriggeredList defined within the VarMeasReportList for this measId for all measurements taken during timeToTrigger defined within the VarMeasConfig for this event:

3> remove the concerned transmission resource pool(s) in the poolsTriggeredList defined within the VarMeasReportList for this measId;

3> if the poolsTriggeredList defined within the VarMeasReportList for this measId is empty:

4> remove the measurement reporting entry within the VarMeasReportList for this measId;

4> stop the periodical reporting timer for this measId, if running

NOTE 1: Void.

2> if reportType is set to periodical and if a (first) measurement result is available:

3> include a measurement reporting entry within the VarMeasReportList for this measId;

3> set the numberOfReportsSent defined within the VarMeasReportList for this measId to 0;

3> if the corresponding reportConfig includes meas-RSSI-ReportConfig:

4> initiate the measurement reporting procedure as specified in 5.5.5 immediately when RSSI sample values are reported by the physical layer after the first L1 measurement duration;

3> else if the corresponding reportConfig includes the ul-DelayValueConfig:

4> initiate the measurement reporting procedure, as specified in 5.5.5, immediately after a first measurement result is pro vided from lower layers of the associated DRB identity;

3> else if the reportAmount exceeds 1:

4> initiate the measurement reporting procedure, as specified in 5.5.5, immediately after the quantity to be reported becomes available for the NR SpCell;

3> else (i.e., the reportAmount is equal to 1):

4> initiate the measurement reporting procedure, as specified in 5.5.5, immediately after the quantity to be reported becomes available for the NR SpCell and for the strongest cell among the applicable cells;

2> if, in case the corresponding reportConfig concerns the reporting for NR sidelink communication, reportType is set to periodical and if a (first) measurement result is available:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5, immediately after the quantity to be reported becomes available for the NR SpCell and CBR measurement results become available;

2> if the reportType is set to cli-EventTriggered and if the entry condition applicable for this event, i.e., the event corresponding with the eventId of the corresponding reportConfig within VarMeasConfig, is fulfilled for one or more applicable CLI measurement resources for all measurements after layer 3 filtering taken during time-ToTrigger defined for this event within the VarMeasConfig, while the VarMeasReportList does not include a measurement reporting entry for this measId (a first CLI measurement resource triggers the event):

3> include a measurement reporting entry within the VarMeasReportList for this measId;

3> set the numberOfReportsSent defined within the VarMeasReportList for this measId to 0;

3> include the concerned CLI measurement resource(s) in the cli-TriggeredList defined within the VarMeasReportList for this measId;

3> initiate the measurement reporting procedure, as specified in 5.5.5;

2> else if the reportType is set to cli-EventTriggered and if the entry condition applicable for this event, i.e., the event corresponding with the eventId of the corresponding reportConfig within VarMeasConfig, is fulfilled for one or more CLI measurement resources not included in the cli-TriggeredList for all measurements after layer 3 filtering taken during timeToTrigger defined for this event within the VarMeasConfig (a subsequent CLI measurement resource triggers the event):

3> set the numberOfReportsSent defined within the VarMeasReportList for this measId to 0;

3> include the concerned CLI measurement resource(s) in the cli-TriggeredList defined within the VarMeasReportList for this measId;

3> initiate the measurement reporting procedure, as specified in 5.5.5;

2> else if the reportType is set to cli-EventTriggered and if the leaving condition applicable for this event is fulfilled for one or more of the CLI measurement resources included in the cli-TriggeredList defined within the VarMeasReportList for this measId for all measurements after layer 3 filtering taken during time-ToTrigger defined within the VarMeasConfig for this event:

3> remove the concerned CLI measurement resource(s) in the cli-TriggeredList defined within the VarMeasReportList for this measId;

3> if reportOnLeave is set to true for the corresponding reporting configuration:

4> initiate the measurement reporting procedure, as specified in 5.5.5;

3> if the cli-TriggeredList defined within the VarMeasReportList for this measId is empty:

4> remove the measurement reporting entry within the VarMeasReportList for this measId;

4> stop the periodical reporting timer for this measId, if running;

2> if reportType is set to cli-Periodical and if a (first) measurement result is available:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5, immediately after the quantity to be reported becomes available for at least one CLI measurement resource;

2> upon expiry of the periodical reporting timer for this measId:

3> initiate the measurement reporting procedure, as specified in 5.5.5.

2> if the corresponding reportConfig includes a report-Type is set to reportSFTD:

3> if the corresponding measObject concerns NR:

4> if the drx-SFTD-NeighMeas is included:

5> if the quantity to be reported becomes available for each requested pair of PCell and NR cell:

6> stop timer T322;

6> initiate the measurement reporting procedure, as specified in 5.5.5;

4> else

5> initiate the measurement reporting procedure, as specified in 5.5.5, immediately after the quantity to be reported becomes available for each requested pair of PCell and NR cell or the maximal measurement reporting delay as specified in TS 38.133 [14];

3> else if the corresponding measObject concerns E-UTRA:

4> initiate the measurement reporting procedure, as specified in 5.5.5, immediately after the quantity to be reported becomes available for the pair of PCell and E-UTRA PSCell or the maximal measurement reporting delay as specified in TS 38.133 [1 4];

2> if reportType is set to reportCGI:

3> if the UE acquired the SIB1 or SystemInformation-BlockType1 for the requested cell; or 3> if the UE detects that the requested NR cell is not transmitting SIB1 (see TS 38.213 [13], clause 13):

4> stop timer T321;

4> include a measurement reporting entry within the VarMeasReportList for this measId;

4> set the numberOfReportsSent defined within the VarMeasReportList for this measId to 0;

4> initiate the measurement reporting procedure, as specified in 5.5.5;

2> upon the expiry of T321 for this measId:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5.

2> upon the expiry of T322 for this measId:

3> initiate the measurement reporting procedure, as specified in 5.5.5.

At operation 1j-30, the UE 1j-01 may transmit a measurement report message (MeasurementReport) to the base station 1j-02.

At operation 1j-35, the UE 1j-01 may determine that a radio link failure has been detected because the T312 timer has expired in the PCell 1j-02.

At operation 1j-40, the UE 1j-01 according to an embodiment of the disclosure proposes to perform at least one of the following operations. Specifically, Operation 1: Radio link failure information is stored in VarRLF-Report. In this case, the UE may set rlf-Cause to one of the spare values.

rlf-Cause-r16 ENUMERATED {t310-Expiry, randomAccessProblem, rlc-MaxNumRetx, beamFailureRecoveryFailure, IbtFailure-r16, bh-rlfRecoveryFailure, spare2, spare1}, In where the base station receives the radio link failure information configured to a spare value, t312 expiry may be inferred implicitly.

Operation 2: In case where the radio link failure is detected due to expiration of T312 in the PCell, the UE may not store radio link failure information in VarRLF-Report. However, the UE may store the radio link failure information in the VarRLF-Report in case where at least one of the following conditions is satisfied.

2> upon T310 expiry in PCell; or

2> upon random access problem indication from MCG MAC while neither T300, T301, T304, T311 nor T319 are running; or 2> upon indication from MCG RLC that the maximum number of retransmissions has been reached; or 2> if connected as an IAB-node, upon BH RLF indication received on BAP entity from the MCG; or 2> upon consistent uplink LBT failure indication from MCG MAC while T 304 is not running:

Operation 3: In case where the UE supports the UE capability described above at operation 1j-10, the radio link failure information is stored in the VarRLF-Report. In this case, the UE may set rlf-Cause to t312-Expiry. In case where the UE does not support the UE capability described above at operation 1j-10, operation 1 or operation 2 described above may be performed.

Operation 4: the radio link failure information is saved in VarRLF-Report. In this case, the UE may set rlf-Cause to an arbitrary value through UE implementation.

rlf-Cause-r16 ENUMERATED {1310-Expiry, randomAccessProblem, rlc-MaxNumRetx, beamFailureRecoveryFailure, IbtFailure-r16, bh-rlfRecoveryFailure, spare2, spare1}, For reference, the UE may determine the content in the VarRLF-Report using the following method.

The UE shall determine the content in the VarRLF-Report as follows:

1> clear the information included in VarRLF-Report, if any;

1> set the plmn-IdentityList to include the list of EPLMNs stored by the UE (i.e., includes the RPLMN);

1> set the measResultLastServCell to include the cell level RSRP, RSRQ and the available SINR, of the source PCell (in case HO failure) or PCell (in case RLF) based on the available SSB and CSI-RS measurements collected up to the mom ent the UE detected failure;

1> if the SS/PBCH block-based measurement quantities are available:

2> set the rsIndexResults in measResultLastServCell to include all the available measurement quantities of the source PCell (in case HO failure) or PCell (in case RLF), ordered such that the highest SS/PBCH block RSRP is listed first if SS/PBCH block RSRP measurement results are available, otherwise the highest SS/PBCH block RSRQ is listed first if SS/PBCH block RSRQ measurement results are available, otherwise the highest SS/PBCH block SINR is listed first, based on the available SS/PBCH block based measurements collected up to the moment the UE detected failure;

1> if the CSI-RS based measurement quantities are available:

2> set the rsIndexResults in measResultLastServCell to include all the available measurement quantities of the source PCell (in case HO failure) or PCell (in case RLF), ordered such that the highest CSI-RS RSRP is listed first if CSI-RS RSRP measurement results are available, otherwise the highest CSI-RS RSRQ is listed first if CSI-RS RSRQ measurement results are available, other wise the highest CSI-RS SINR is listed first, based on the available CSI-RS based measurements collected up to the moment the UE detected failure;

1> set the ssbRLMConfigBitmap and/or csi-rsRLMConfigBitmap in measResultLastServCell to include the radio link monitoring configuration of the source PCell (in case HO failure) or PCell (in case RLF), if available;

1> for each of the configured measObjectNR in which measurements are available:

2> if the SS/PBCH block-based measurement quantities are available:

3> set the measResultListNR in measResultNeighCells to include all the available measurement quantities of the best measured cells, other than the source PCell (in case HO failure) or PCell (in case RLF), ordered such that the cell with highest SS/PBCH block RSRP is listed first if SS/PBCH block RSRP measurement results are available, otherwise the cell with highest SS/PBCH block RSRQ is listed first if SS/PBCH bloc k RSRQ measurement results are available, otherwise the cell with highest SS/PBCH block SINR is listed first, based on the available SS/PBCH block based measurements collected up to the moment the UE detected failure;

4> for each neighbour cell included, include the option al fields that are available;

2> if the CSI-RS based measurement quantities are available:

3> set the measResultListNR in measResultNeighCells to include all the available measurement quantities of the best measured cells, other than the source PCell (in case HO failure) or PCell (in case RLF), ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected radio link failure;

4> for each neighbour cell included, include the option al fields that are available;

1> for each of the configured EUTRA frequencies in which measurements a re available;

2> set the measResultListEUTRA in measResultNeighCells to include the best measured cells ordered such that the cell with highest RSRP is listed first if RSRP measurement results are available, otherwise the cell with highest RSRQ is listed first, and based on measurements collected up to the moment the UE detected failure;

3> for each neighbour cell included, include the optional fields that are available;

NOTE 1: The measured quantities are filtered by the L3 filter as con figured in the mobility measurement configuration. The measurements are based on the time domain measurement resource restriction, if configured. Blacklisted cells are not required to be reported.

1> set the c-RNTI to the C-RNTI used in the source PCell (in case HO failure) or PCell (in case RLF);

1> if the failure is detected due to reconfiguration with sync failure as described in 5.3.5.8.3, set the fields in VarRLF-report as follows:

2> set the connection FailureType to hof;

2> set the nrFailedPCellId in failedPCellId to the global cell identity and tracking area code, if available, and otherwise to the physical cell identity and carrier frequency of the target PCell of the failed handover;

2> include nrPreviousCell in previousPCellId and set it to the global cell identity and tracking area code of the PCell where the last RRCReconfiguration message including reconfiguration WithSync was received;

2> set the timeConnFailure to the elapsed time since reception of the last RRCReconfiguration message including the reconfiguration WithSync;

1> else if the failure is detected due to Mobility from NR failure as described in 5.4.3.5, set the fields in VarRLF-report as follows:

2> set the connection FailureType to hof;

2> if last MobilityFromNRCommand concerned a failed inter-RAT handover from NR to E-UTRA and if the UE supports Radio Link Failure Report for Inter-RAT MRO EUTRA (NR to EUTRA):

3> set the eutraFailedPCellId in failedPCellId to the global cell identity and tracking area code, if available, and otherwise to the physical cell identity and carrier frequency of the target PCell of the failed handover;

2> include nrPreviousCell in previousPCellId and set it to the global cell identity and tracking area code of the PCell where the last MobilityFromNRCommand message was received;

2> set the timeConnFailure to the elapsed time since reception of the last MobilityFromNRCommand message;

1> else if the failure is detected due to radio link failure as described in 5.3.10.3, set the fields in VarRLF-report as follows:

2> set the connection FailureType to rlf;

2> set the rlf-Cause to the trigger for detecting radio link failure in accordance with clause 5.3.10.4;

2> set the nrFailedPCellId in failedPCellId to the global cell identity and the tracking area code, if available, and otherwise to the physical cell identity and carrier frequency of the PCell where radio link failure is detected;

2> if an RRCReconfiguration message including the reconfiguration WithSync was received before the connection failure:

3> if the last RRCReconfiguration message including the reconfiguration WithSync concerned an intra NR handover:

4> include the nrPreviousCell in previousPCellId and s et it to the global cell identity and the tracking area code of the PC ell where the last RRCReconfiguration message including reconfiguration WithSync was received;

4> set the timeConnFailure to the elapsed time since reception of the last RRCReconfiguration message including the reconfiguration WithSync;

3> else if the last RRCReconfiguration message including the reconfiguration WithSync concerned a handover to NR from E-UTRA and if the UE supports Radio Link Failure Report for Inter-RAT MRO EUTRA:

4> include the eutraPreviousCell in previousPCellId and set it to the global cell identity and the tracking area code of the E-UTRA PCell where the last RRCReconfiguration message including reconfiguration WithSync was received embedded in E-UT RA RRC message MobilityFromEUTRACommand message as specified in TS 36.331 clause 5.4.3.3;

4> set the timeConnFailure to the elapsed time since reception of the last RRCReconfiguration message including the reconfiguration With-Sync embedded in E-UTRA RRC message MobilityFromEUTRACommand message as specified in TS 36.331 [1 0] clause 5.4.3.3;

1> if connectionFailureType is rlf and the rlf-Cause is set to randomAccessProblem or beamFailureRecovery-Failure; or 1> if connectionFailureType is hof and if the failed handover is an intra-RAT handover:

2> set the ra-InformationCommon to include the random-access related information as described in sub-clause 5.7.10.5;

1> if available, set the locationInfo as in 5.3.3.7.

Figure 1K:
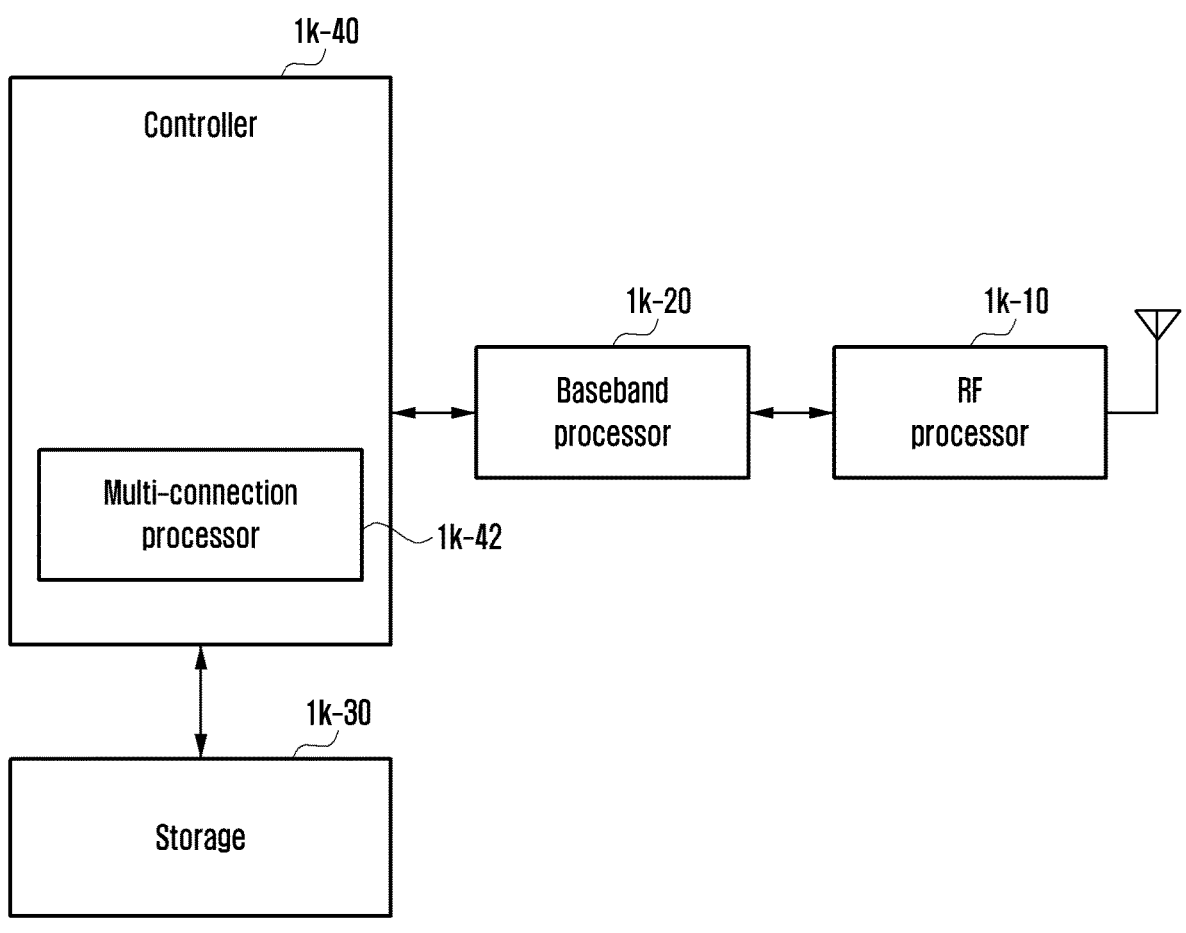
FIG. 1K is a block diagram illustrating an inner structure of a UE according to an embodiment of the disclosure.

FIG. 1K is a block diagram illustrating an internal structure of a UE according to an embodiment of the disclosure.

Referring to the above drawing, the UE may include a radio frequency (RF) processor 1k-10, a baseband processor 1k-20, a storage 1k-30, and a controller 1k-40.

The RF processor 1k-10 may perform a function for transmitting and receiving a signal on a radio channel, such as signal band conversion and amplification. For example, the RF processor 1k-10 performs up-conversion of a baseband signal provided from the baseband processor 1k-20 into an RF-band signal to transmit the converted signal through an antenna, and performs down-conversion of the RF-band signal received through the antenna into a baseband signal. For example, the RF processor 1k-10 may include a transmission filter, a reception filter, an amplifier, a mixer, an oscillator, a digital to analog converter (DAC), and an analog to digital converter (ADC). Although only one antenna is illustrated in the drawing, the UE may be provided with a plurality of antennas. Further, the RF processor 1k-10 may include a plurality of RF chains. Further, the RF processor 1k-10 may perform beamforming. For the beamforming, the RF processor 1k-10 may adjust phases and sizes of signals transmitted or received through the plurality of antennas or antenna elements. Further, the RF processor 1k-10 may perform MIMO, and may receive several layers during performing of the MIMO operation.

The baseband processor 1k-20 performs a conversion function between a baseband signal and a bit string in accordance with the physical layer standard of the system. For example, during data transmission, the baseband processor 1k-20 generates complex symbols by encoding and modulating a transmitted bit string. Further, during data reception, the baseband processor 1k-20 restores a received bit string by demodulating and decoding the baseband signal provided from the RF processor 1k-10. For example, in case of following an orthogonal frequency division multiplexing (OFDM) method, during data transmission, the baseband processor 1k-20 generates complex symbols by encoding and modulating a transmitted bit string, performs mapping of the complex symbols onto subcarriers, and then constitutes OFDM symbols through the inverse fast Fourier transform (IFFT) operation and cyclic prefix (CP) insertion. Further, during data reception, the baseband processor 1k-20 divides the baseband signal being provided from the RF processor 1k-10 in the unit of OFDM symbols, restores the signals mapped onto the subcarriers through the fast Fourier transform (FFT) operation, and then restores the received bit string through demodulation and decoding.

The baseband processor 1k-20 and the RF processor 1k-10 transmit and receive the signals as described above. Accordingly, the baseband processor 1k-20 and the RF processor 1k-10 may be called a transmitter, a receiver, a transceiver, or a communication unit. Further, in order to support different radio access technologies, at least one of the baseband processor 1k-20 and the RF processor 1k-10 may include a plurality of communication modules. Further, in order to process signals of different frequency bands, at least one of the baseband processor 1k-20 and the RF processor 1k-10 may include different communication modules. For example, the different radio access technologies may include a wireless local area network (LAN) (e.g., Institute of Electrical and Electronics Engineers (IEEE) 802.11) and a cellular network (e.g., LTE). Further, the different frequency bands may include super high frequency (SHF) (e.g., 2.NR Hz or NR Hz) band and millimeter wave (e.g., 60 GHz) band.

The storage 1k-30 stores therein a basic program for an operation of the UE, application programs, and data of configuration information. More particularly, the storage 1k-30 may store information related to a second connection node that performs wireless communication by using a second radio access technology. Further, the storage 1k-30 provides stored data in accordance with a request from the controller 1k-40.

The controller 1k-40 controls the overall operation of the UE. For example, the controller 1k-40 transmits and receives signals through the baseband processor 1k-20 and the RF processor 1k-10. Further, the controller 1k-40 records or reads data in or from the storage 1k-30. For this, the controller 1k-40 may include at least one processor. For example, the controller 1k-40 may include a multi-communication processor (CP) 1k-42 performing a control for communication and an application processor (AP) controlling a higher layer, such as an application program.

FIG. 1L is a block diagram illustrating a constitution of an NR base station according to an embodiment of the disclosure.

Referring to FIG. 1L, as illustrated in the drawing, a base station is constituted to include an RF processor 1L-10, a baseband processor 1L-20, a backhaul communication unit 1L-30, a storage 1L-40, and a controller 1L-50.

The RF processor 1L-10 performs a function for transmitting and receiving a signal on a radio channel, such as signal band conversion and amplification. For example, the RF processor IL-10 performs up-conversion of a baseband signal provided from the baseband processor 1L-20 into an RF-band signal to transmit the converted signal through an antenna, and performs down-conversion of the RF-band signal received through the antenna into a baseband signal. For example, the RF processor IL-10 may include a transmission filter, a reception filter, an amplifier, a mixer, an oscillator, a DAC, an ADC, and the like. Although only one antenna is illustrated in the drawing, the first access node may be provided with a plurality of antennas. Further, the RF processor 1L-10 may include a plurality of RF chains. Further, the RF processor IL-10 may perform beamforming. For the beamforming, the RF processor 1L-10 may adjust phases and sizes of signals transmitted or received through the plurality of antennas or antenna elements. The RF processor IL-10 may perform down MIMO operation through transmission of one or more layers.

The baseband processor 1L-20 performs conversion function between a baseband signal and a bit string in accordance with the physical layer standard of the first radio access technology. For example, during data transmission, the baseband processor 1L-20 generates complex symbols by encoding and modulating a transmitted bit string. Further, during data reception, the baseband processor IL-20 restores a received bit string by demodulating and decoding the baseband signal provided from the RF processor 1L-10. For example, in case of following an OFDM method, during data transmission, the baseband processor IL-20 generates complex symbols by encoding and modulating a transmitted bit string, performs mapping of the complex symbols to subcarriers, and then constitutes OFDM symbols through the IFFT operation and CP insertion. Further, during data reception, the baseband processor 1L-20 divides the baseband signal provided from the RF processor IL-10 in the unit of OFDM symbols, restores the signals mapped to the subcarriers through the FFT operation, and then restores the received bit string through demodulation and decoding. The baseband processor IL-20 and the RF processor 1L-10 transmit and receive the signals as described above. Accordingly, the baseband processor 1L-20 and the RF processor 1L-10 may be called a transmitter, a receiver, a transceiver, a communication unit, or a wireless communication unit.

The backhaul communication unit 1L-30 provides an interface for performing communication with other nodes in the network. For example, the backhaul communication unit 1L-30 converts a bit string being transmitted from the main base station to other nodes, for example, an auxiliary base station and a core network, into a physical signal, and converts the physical signal being received from other nodes into a bit string.

The storage 1L-40 stores therein a basic program for an operation of the main base station, application programs, and data of configuration information. More particularly, the storage IL-40 may store information on a bearer allocated to the connected UE and the measurement result reported from the connected UE. Further, the storage 1L-40 may store information that becomes a basis of determination whether to provide or suspend a multi-connection to the UE. Further, the storage 1L-40 provides stored data in accordance with a request from the controller IL-50.

The controller 1L-50 controls the overall operation of the main base station. For example, the controller 1L-50 transmits and receives signals through the baseband processor 1L-20 and the RF processor 1L-10 or through the backhaul communication unit 1L-30. Further, the controller 1L-50 records and reads data in or from the storage 1L-40. For this, the controller 1L-50 may include at least one multi-connection processor 1L-52.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   entering a radio resource control (RRC) connected mode with a first primary cell (PCell);
   performing a secondary node addition procedure with a primary secondary cell (PSCell);
   identifying whether the UE supports PSCell mobility history information (MHI) and the PSCell is released at a same time as a change of the first PCell to a second PCell;

in case that the UE supports the PSCell MHI and the PSCell is released at the same time as the change of the first PCell to the second PCell, storing visited information associated with the PSCell; and transmitting, to the second PCell, a response message including the stored visited information associated with the PSCell.

2. The method of claim 1, wherein the visited information includes at least one of an identity of the PSCell or time spent in the PSCell while being connected to the first PCell.

3. The method of claim 2, wherein the identity of the PSCell is a global cell identity, in case that the global cell identity is available.

4. The method of claim 2, wherein the identity of the PSCell is a physical cell identity and the visited information further includes carrier frequency of a physical cell, in case that a global cell identity is not available.

5. The method of claim 1, further comprising:
   transmitting, to the first PCell, UE capability information including a PSCell MHI indicator.

6. The method of claim 1,
   wherein the visited information associated with the PSCell is stored in a visitedPSCellInfoList, and
   wherein oldest visited information is removed from the visitedPSCellInfoList prior to storing the visited information associated with the PSCell.

7. A user equipment (UE) in a wireless communication system, the UE comprising:
   a transceiver; and
   at least one processor configured to:
      enter a radio resource control (RRC) connected mode with a first primary cell (PCell),
      perform a secondary node addition procedure with a primary secondary cell (PSCell),
      identify whether the UE supports PSCell mobility history information (MHI) and the PSCell is released at a same time as a change of the first PCell to a second PCell,
      in case that the UE supports the PSCell MHI and the PSCell is released at the same time as the change of the first PCell to the second PCell, store visited information associated with the PSCell, and
      transmit, to the second PCell, a response message including the stored visited information associated with the PSCell.

8. The UE of claim 7, wherein the visited information includes at least one of an identity of the PSCell or time spent in the PSCell while being connected to the first PCell.

9. The UE of claim 8, wherein the identity of the PSCell is a global cell identity, in case that the global cell identity is available.

10. The UE of claim 8, wherein the identity of the PSCell is a physical cell identity and the visited information further includes carrier frequency of a physical cell, in case that a global cell identity is not available.

11. The UE of claim 7, wherein the at least one processor is further configured to:
   transmit, to the first PCell, UE capability information including a PSCell MHI indicator.

* * * * *